United States Patent
Shinozaki

(10) Patent No.: US 9,564,818 B2
(45) Date of Patent: Feb. 7, 2017

(54) DC/DC CONVERTER CAPABLE OF PREVENTING OVERVOLTAGE AND OVERCURRENT, OPERATION METHOD THEREOF AND ELECTRONIC APPARATUS

(71) Applicant: ROHM CO., LTD., Kyoto (JP)

(72) Inventor: Yuichi Shinozaki, Kyoto (JP)

(73) Assignee: ROHM CO., LTD, Kyoto (JP)

( * ) Notice: Subject to any disclaimer, the term of this patent is extended or adjusted under 35 U.S.C. 154(b) by 30 days.

(21) Appl. No.: 14/468,996

(22) Filed: Aug. 26, 2014

(65) Prior Publication Data

US 2015/0138845 A1    May 21, 2015

(30) Foreign Application Priority Data

Aug. 26, 2013   (JP) ................. 2013-174327

(51) Int. Cl.
*H02M 1/00*   (2006.01)
*H02M 3/335*   (2006.01)
*H02M 1/36*   (2007.01)
*H02M 1/34*   (2007.01)

(52) U.S. Cl.
CPC ........... *H02M 3/33546* (2013.01); *H02M 1/36* (2013.01); *H02M 3/33523* (2013.01); *H02M 3/33569* (2013.01); *H02M 3/33592* (2013.01); *H02M 2001/0058* (2013.01); *H02M 2001/342* (2013.01); *Y02B 70/1475* (2013.01); *Y02B 70/1491* (2013.01)

(58) Field of Classification Search
CPC ............ H02M 3/33546; H02M 3/33553; H02M 3/33561; H02M 3/33592; H02M 1/34; H02M 1/36; H02M 2001/0058

USPC .............. 363/13, 15–16, 20, 21.01, 21.04, 21.06, 363/21.1, 21.11
See application file for complete search history.

(56) References Cited

U.S. PATENT DOCUMENTS

| | | | |
|---|---|---|---|
| 5,590,032 A | 12/1996 | Bowman et al. | |
| 5,999,420 A * | 12/1999 | Aonuma | H02M 3/33592 363/127 |
| 6,191,964 B1 * | 2/2001 | Boylan | H02J 1/102 323/239 |
| 6,496,395 B2 * | 12/2002 | Tokunaga | H02M 3/33592 363/21.06 |

(Continued)

FOREIGN PATENT DOCUMENTS

| | | | |
|---|---|---|---|
| JP | H06098540 A | 4/1994 | |
| JP | H10313573 A | 11/1998 | |

(Continued)

*Primary Examiner* — Jessica Han
*Assistant Examiner* — David A. Singh
(74) *Attorney, Agent, or Firm* — Cantor Colburn LLP

(57) ABSTRACT

A DC/DC converter includes: a transformer; a main MOS transistor connected in series between a primary side inductance of the transformer and a ground potential; a synchronous rectification MOS transistor connected in series between a secondary side inductance of the transformer and the ground potential; a refluxing MOS transistor connected between a secondary side output of the transformer and the ground potential; and a controller. If an operation is stopped, the controller stops the main MOS transistor and stops the synchronous rectification MOS transistor and the refluxing MOS transistor after a lapse of a predetermined period of time.

13 Claims, 21 Drawing Sheets

(56) References Cited

U.S. PATENT DOCUMENTS

| | | | | |
|---|---|---|---|---|
| 6,625,043 B2* | 9/2003 | Hatta | ................ | H02M 3/33592 |
| | | | | 363/21.06 |
| 6,711,035 B2* | 3/2004 | Tomioka | ........... | H02M 3/33592 |
| | | | | 323/282 |
| 6,760,235 B2* | 7/2004 | Lin | ......................... | H02M 1/36 |
| | | | | 363/21.06 |
| 6,961,253 B1* | 11/2005 | Cohen | ...................... | H02M 1/08 |
| | | | | 363/89 |
| 7,042,739 B2* | 5/2006 | Nagai | ............... | H02M 3/33592 |
| | | | | 363/21.02 |
| 7,196,914 B2* | 3/2007 | Ren | .................... | H02M 3/33569 |
| | | | | 363/17 |
| 7,499,294 B2* | 3/2009 | Lin | ................... | H02M 3/33592 |
| | | | | 363/21.06 |
| 7,542,310 B2* | 6/2009 | Chang | ............... | H02M 3/33592 |
| | | | | 363/21.05 |
| 2006/0072349 A1* | 4/2006 | Lin | ................... | H02M 3/33592 |
| | | | | 363/21.06 |
| 2009/0080223 A1* | 3/2009 | Wang | ................ | H02M 3/33561 |
| | | | | 363/21.06 |
| 2009/0257250 A1* | 10/2009 | Liu | ................... | H02M 3/33592 |
| | | | | 363/21.06 |
| 2013/0063982 A1* | 3/2013 | Ye | ..................... | H02M 3/33592 |
| | | | | 363/17 |

FOREIGN PATENT DOCUMENTS

| | | |
|---|---|---|
| JP | H11187653 A | 7/1999 |
| JP | 2004173480 A | 6/2004 |

* cited by examiner

DC/DC CONVERTER CAPABLE OF PREVENTING OVERVOLTAGE AND OVERCURRENT, OPERATION METHOD THEREOF AND ELECTRONIC APPARATUS

CROSS-REFERENCE TO RELATED APPLICATIONS

This application is based upon and claims the benefit of priority from Japanese Patent Applications No. 2013-174327, filed on Aug. 26, 2013, the entire contents of which are incorporated herein by reference.

TECHNICAL FIELD

The present disclosure relates to a DC/DC converter, an operation method thereof and an electronic apparatus, and more particularly relates to a DC/DC converter capable of preventing an overvoltage and an overcurrent.

BACKGROUND

A DC/DC converter is used as a power supply for supplying power. The DC/DC converter may be any one of a diode rectification type or a synchronous rectification type. The DC/DC converter of the synchronous rectification type may include a self-driving system. In addition, for the DC/DC converter of the synchronous rectification type, there has been also proposed a driving control system in which a primary controller for controlling a primary switching element controls a secondary switching element for synchronous rectification.

SUMMARY

The present disclosure provides some embodiments of a DC/DC converter, an operation method thereof and an electronic device equipped with the DC/DC converter, in which the DC/DC converter is capable of preventing an overvoltage and an overcurrent that may occur when an operation of the DC/DC converter stops.

According to one embodiment of the present disclosure, there is provided a DC/DC converter including: a transformer interposed between an input and an output of the DC/DC converter; a main MOS transistor connected in series between a primary side inductance of the transformer and a ground potential; a synchronous rectification MOS transistor connected in series between a secondary side inductance of the transformer and the ground potential; a refluxing MOS transistor connected between a secondary side output of the transformer and the ground potential and capable of refluxing an output current of the DC/DC converter; and a controller connected to the main MOS transistor, the synchronous rectification MOS transistor and the refluxing MOS transistor and capable of controlling input currents and output currents thereof, wherein, if an operation of the DC/DC converter is stopped at predetermined time, the controller stops the main MOS transistor and then stops the synchronous rectification MOS transistor and the refluxing MOS transistor after a lapse of a predetermined period of time by a soft stop operation.

According to another embodiment of the present disclosure, there is provided a DC/DC converter including: a transformer interposed between an input and an output of the DC/DC converter; a main MOS transistor connected in series between a primary side inductance of the transformer and a ground potential; an auxiliary MOS transistor connected in series between the primary side inductance of the transformer and the ground potential via a capacitor and connected in parallel to the primary side main MOS transistor; a synchronous rectification MOS transistor connected in series between a secondary side inductance of the transformer and the ground potential; a refluxing MOS transistor connected between a secondary side output of the transformer and the ground potential and capable of refluxing an output current of the DC/DC converter; and a controller capable of controlling the main MOS transistor, the auxiliary MOS transistor, the synchronous rectification MOS transistor and the refluxing MOS transistor, wherein, if an operation of the DC/DC converter is stopped at predetermined time, a driving pulse of the main MOS transistor output from the controller is stopped, and a driving pulse of the synchronous rectification MOS transistor, a driving pulse of the refluxing MOS transistor and a driving pulse of the auxiliary MOS transistor, both of which are output from the controller, are stopped after a lapse of a predetermined period of time by a soft stop operation.

According to another embodiment of the present disclosure, there is provided a DC/DC converter including: a transformer interposed between an input and an output of the DC/DC converter; a main MOS transistor connected in series between a primary side inductance of the transformer and a ground potential; an auxiliary MOS transistor connected in series between the primary side inductance of the transformer and the ground potential via a capacitor and connected in parallel to the primary side main MOS transistor; a synchronous rectification MOS transistor connected in series between a secondary side inductance of the transformer and the ground potential; a refluxing MOS transistor connected between a secondary side output of the transformer and the ground potential and capable of refluxing an output current of the DC/DC converter; and a controller capable of controlling the main MOS transistor, the auxiliary MOS transistor, the synchronous rectification MOS transistor and the refluxing MOS transistor, wherein, if an operation of the DC/DC converter is stopped at predetermined time, dead time is alleviated by providing an ON-ON overlap time at a timing of ON/OFF switching of a driving pulse of the synchronous rectification MOS transistor and a driving pulse of the refluxing MOS transistor, both of which are output from the controller in order to prevent an overvoltage from occurring in drains of the synchronous rectification MOS transistor and the refluxing MOS transistor.

According to another embodiment of the present disclosure, there is provided a method of operating a DC/DC converter including a transformer interposed between an input and an output of the DC/DC converter, a main MOS transistor connected in series between a primary side inductance of the transformer and a ground potential, an auxiliary MOS transistor connected in series between the primary side inductance of the transformer and the ground potential via a capacitor and connected in parallel to the primary side main MOS transistor, a synchronous rectification MOS transistor connected in series between a secondary side inductance of the transformer and the ground potential, a refluxing MOS transistor connected between a secondary side output of the transformer and the ground potential and capable of refluxing an output current of the DC/DC converter, and a controller connected to the main MOS transistor, the auxiliary MOS transistor, the synchronous rectification MOS transistor and the refluxing MOS transistor and capable of controlling input currents and output currents thereof, including: turning off the main MOS transistor at a first timing; continuing switching of the auxiliary MOS transistor, the synchronous rectification MOS transistor and the refluxing MOS transistor for a predetermined period of time without stopping the auxiliary MOS transistor, the synchronous rectification MOS transistor and the refluxing MOS transistor at the first timing; and turning off the auxiliary MOS transistor, the synchronous rectification MOS transistor and the refluxing MOS transistor after lapse of the predetermined period of time, wherein an overcurrent is prevented from being flown through the refluxing MOS transistor.

According to another embodiment of the present disclosure, there is provided a method of operating a DC/DC converter including a transformer interposed between an input and an output of the DC/DC converter, a main MOS transistor connected in series between a primary side inductance of the transformer and a ground potential, an auxiliary MOS transistor connected in series between the primary side inductance of the transformer and the ground potential via a capacitor and connected in parallel to the primary side main MOS transistor, a synchronous rectification MOS transistor connected in series between a secondary side inductance of the transformer and the ground potential, a refluxing MOS transistor connected between a secondary side output of the transformer and the ground potential and capable of refluxing an output current of the DC/DC converter, and a controller connected to the main MOS transistor, the auxiliary MOS transistor, the synchronous rectification MOS transistor and the refluxing MOS transistor and capable of controlling input currents and output currents thereof, including: turning off the main MOS transistor at a first timing; continuing switching of the auxiliary MOS transistor, the synchronous rectification MOS transistor and the refluxing MOS transistor for a predetermined period of time without stopping the auxiliary MOS transistor, the synchronous rectification MOS transistor and the refluxing MOS transistor at the first timing; and turning off the auxiliary MOS transistor, the synchronous rectification MOS transistor and the refluxing MOS transistor after lapse of the predetermined period of time, wherein dead time is alleviated by providing an ON-ON overlap time at a timing of ON/OFF switching of the synchronous rectification MOS transistor and the refluxing MOS transistor in order to prevent an overvoltage from occurring in drains of the synchronous rectification MOS transistor and the refluxing MOS transistor.

DETAILED DESCRIPTION

Figure 1:
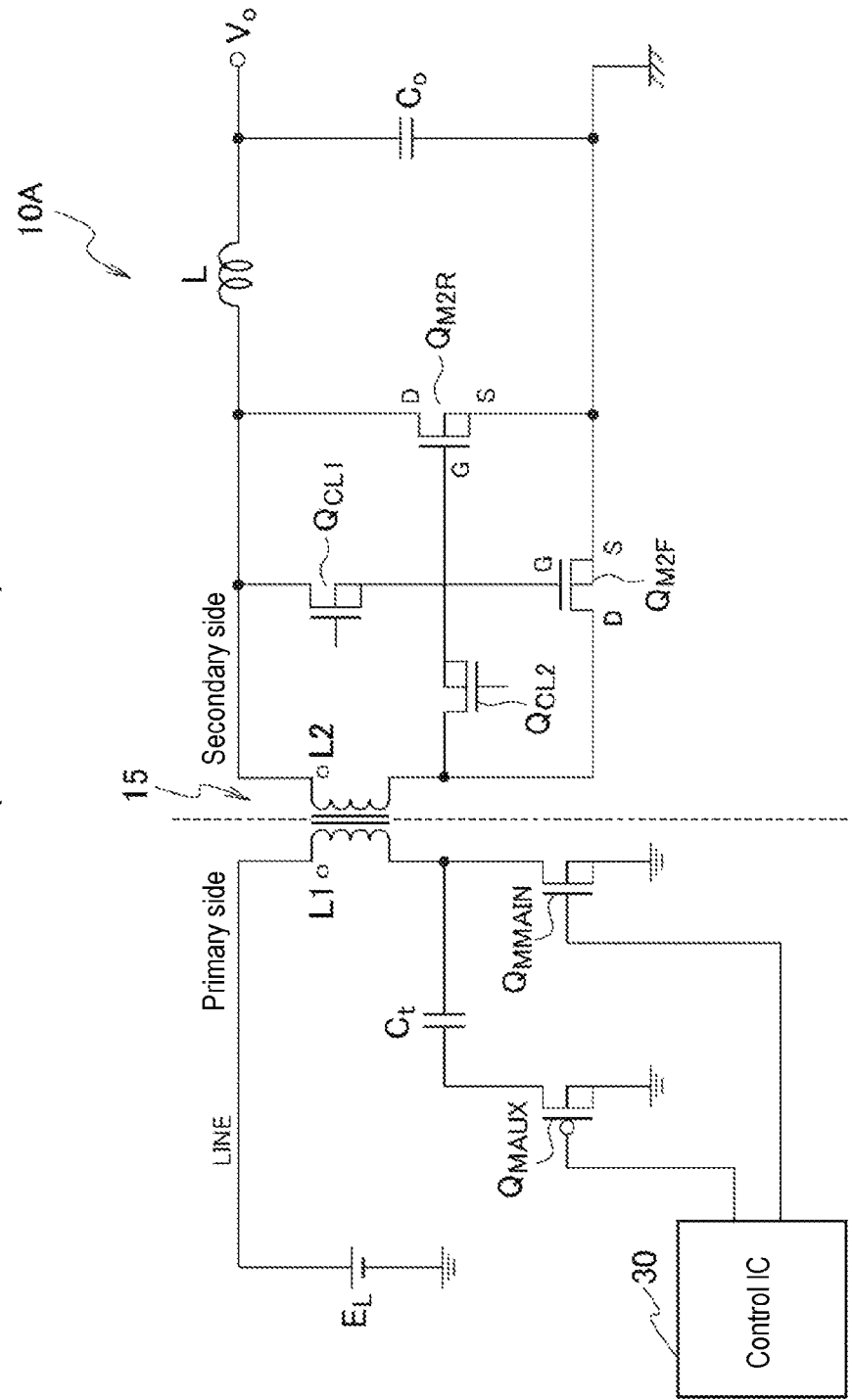
FIG. 1 is a circuit diagram of a DC/DC converter according to a comparative example.

Embodiments of the present disclosure will now be described in detail with reference to the drawings. Throughout the drawings, the same or similar elements are denoted by the same or similar reference numerals. It is however noted that the drawings are just schematic and relationships between thickness and planar dimension of elements, thickness ratios of various layers and so on may be unrealistic. Accordingly, detailed thickness and dimensions should be determined in consideration of the following description. In addition, it is to be understood that the figures include different dimensional relationships and ratios.

The following embodiments are provided to illustrate devices and methods to embody the technical ideas of the present disclosure and are not limited to materials, forms, structures, arrangements and so on of elements detailed herein. The embodiments of the present disclosure may be modified in different ways without departing from the spirit and scope of the invention defined in the claims.

In the following description, a "MOS transistor" may represent an "insulating gate field effect transistor (MOSFET: Metal Oxide Semiconductor Field Effect Transistor)". The "MOS transistor" will be used in notation throughout the specification for the purpose of simplification.

Comparative Example

FIG. 1 is a circuit diagram of a DC/DC converter 10A according to a comparative example. As shown in FIG. 1, the DC/DC converter 10A according to the comparative example includes a transformer 15 interposed between an input and an output of the DC/DC converter 10A, a main MOS transistor $Q_{MMAIN}$ connected in series between a primary inductance L1 of the transformer 15 and a ground potential, a synchronous rectification MOS transistor $Q_{M2F}$ connected in series between a secondary inductance L2 of the transformer 15 and the ground potential, a refluxing MOS transistor $Q_{M2R}$ which is connected between a secondary output of the transformer 15 and the ground potential and is capable of refluxing an output current of the DC/DC converter 10A, a first clamping MOS transistor $Q_{CL1}$ which clamps the synchronous rectification MOS transistor $Q_{M2F}$, a second clamping MOS transistor $Q_{CL2}$ which clamps the refluxing MOS transistor $Q_{M2R}$, an auxiliary MOS transistor $Q_{MAUX}$ connected in series between the primary inductance L1 of the transformer 15 and the ground potential via a capacitor $C_t$ and connected in parallel to the main MOS transistor $Q_{MMAIN}$, and a controller 30 connected to the main MOS transistor $Q_{MMAIN}$ and the auxiliary MOS transistor $Q_{MAUX}$ for controlling input currents thereof.

A line voltage $E_L$ is applied to the input of the DC/DC converter 10A. The secondary inductance L2 of the transformer 15 is connected to the output of the DC/DC converter 10A via an output inductor L. An output capacitor $C_O$ is connected to the output of the DC/DC converter 10A.

The first clamping MOS transistor $Q_{CL1}$ and the second clamping MOS transistor $Q_{CL2}$ have respective gates connected to the output of the DC/DC converter 10A and applied with, for example, the same voltage as the output voltage $V_O$ (a constant voltage of, for example, 12V).

Figure 2:
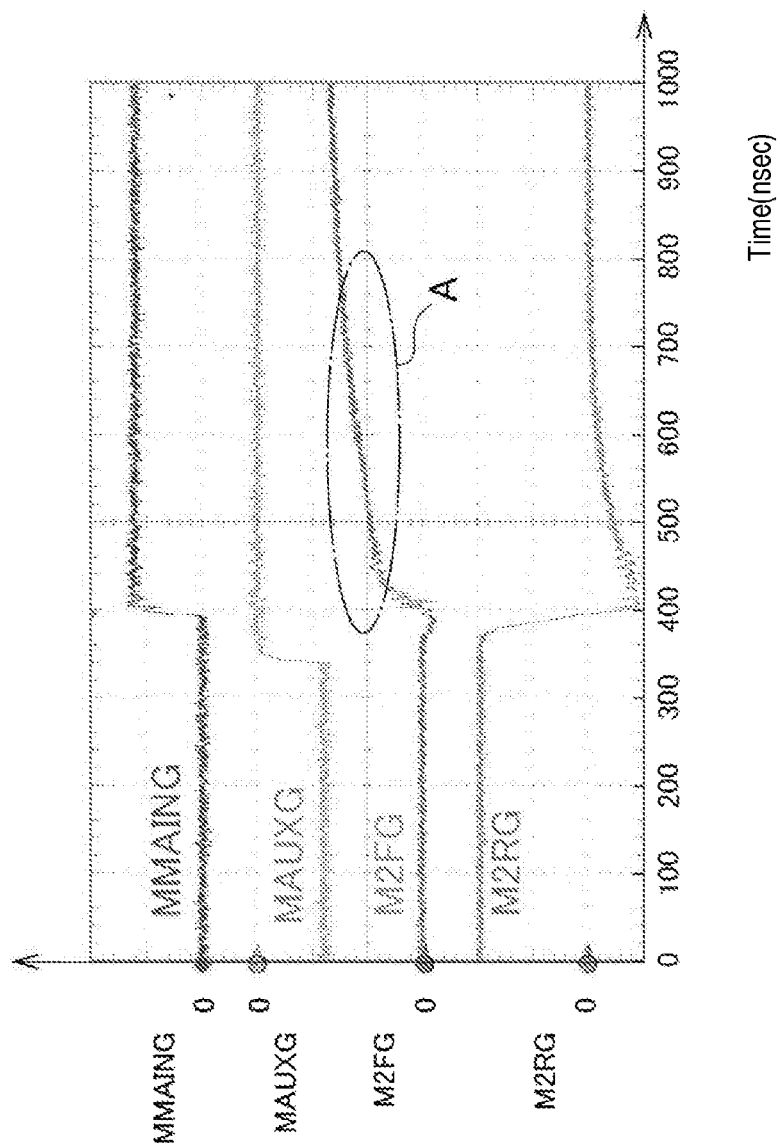
FIG. 2 is a view showing an operation waveform of the DC/DC converter according to the comparative example of FIG. 1.

FIG. 2 shows an operation waveform of the DC/DC converter 10A according to the comparative example of FIG. 1.

In operation of the DC/DC converter 10A according to the comparative example of FIG. 1, when gate voltages $M_{MAING}$ and $M_{AUXG}$ for driving the main MOS transistor $Q_{MMAIN}$ and the auxiliary MOS transistor $Q_{MAUX}$ respectively are supplied from the controller 30, gate voltages of the synchronous rectification MOS transistor $Q_{M2F}$ and the refluxing MOS transistor $Q_{M2R}$ show a transient response operation denoted by M2FG and M2RG, respectively, as shown in FIG. 2.

In the DC/DC converter 10A having a self-driving system, as parasitic capacitance and ON resistance are increased by the clamping MOS transistors $Q_{CL1}$ and $Q_{CL2}$, and the gate voltages of the synchronous rectification MOS transistor $Q_{M2F}$ and the refluxing MOS transistor $Q_{M2R}$ are slowly raised, as shown in FIG. 2. In particular, as shown in portion A in FIG. 2, since the ON resistance of the first clamping MOS transistor $Q_{CL1}$ is large, the gate voltage M2FG of the synchronous rectification MOS transistor $Q_{M2F}$ is slowly raised. As a result, power conversion efficiency of the DC/DC converter 10A according to the comparative example decreases.

Embodiments

Figure 3:
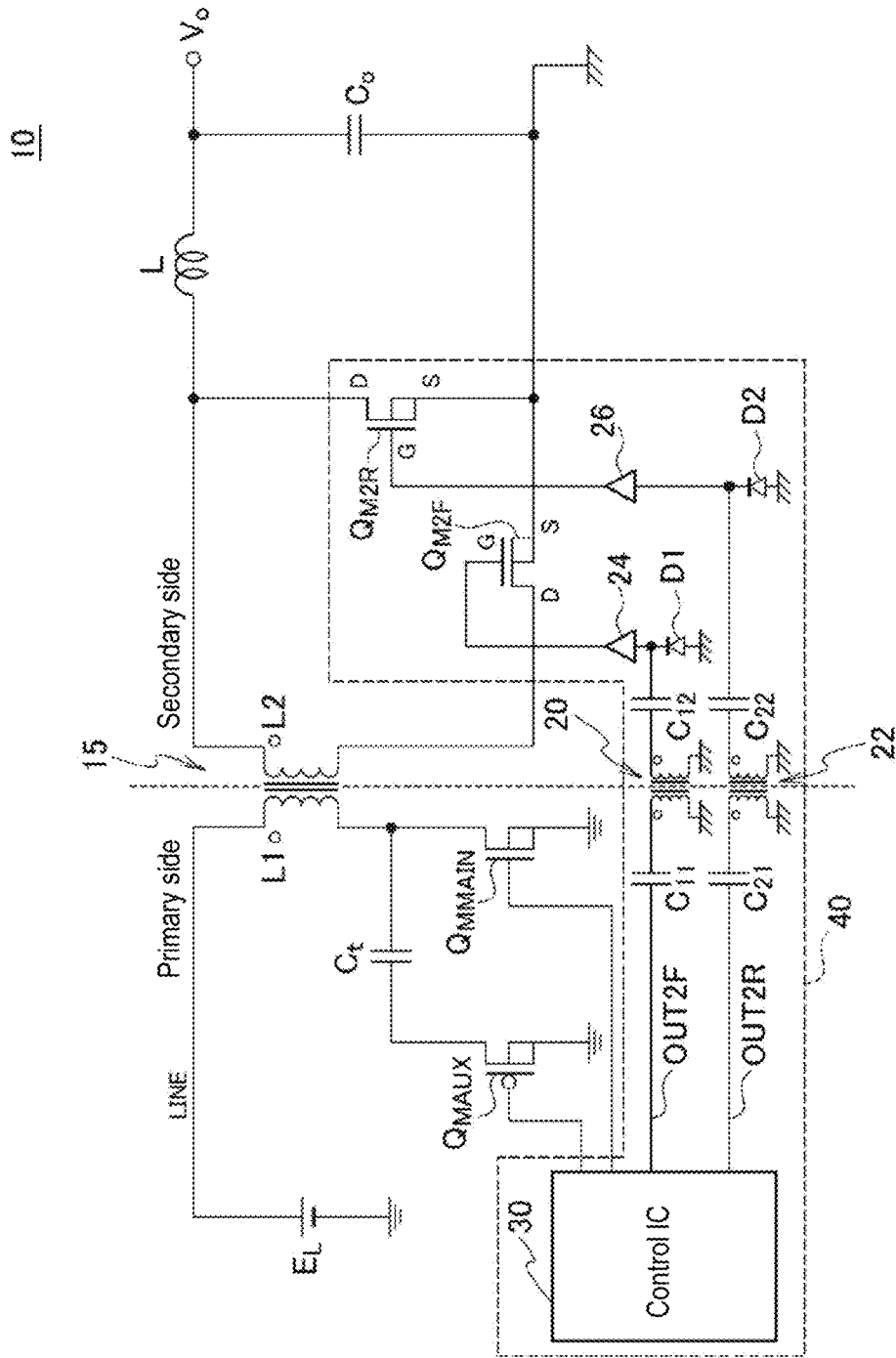
FIG. 3 is a circuit diagram of a DC/DC converter according to some embodiments.

FIG. 3 is a circuit diagram of a DC/DC converter 10 according to some embodiments. As shown in FIG. 3, the DC/DC converter 10 includes a transformer 15 interposed between an input and an output of the DC/DC converter 10, a main MOS transistor $Q_{MMAIN}$ connected in series between a primary inductance L1 of the transformer 15 and a ground potential, a synchronous rectification MOS transistor $Q_{M2F}$ connected in series between a secondary inductance L2 of the transformer 15 and the ground potential, a refluxing MOS transistor $Q_{M2R}$ which is connected between a secondary output of the transformer 15 and the ground potential and is capable of refluxing an output current of the DC/DC converter 10, and a controller 30 connected to the main MOS transistor $Q_{MMAIN}$, the synchronous rectification MOS transistor $Q_{M2F}$ and the refluxing MOS transistor $Q_{M2R}$ for controlling output currents as well as input currents thereof. If an operation of the DC/DC converter 10, which may be utilized to supply power, is stopped at predetermined time, the controller 30 may stop the main MOS transistor $Q_{MMAIN}$ at that time and then stop the synchronous rectification MOS transistor $Q_{M2F}$ and the refluxing MOS transistor $Q_{M2R}$ after a lapse of a predetermined period of time by a soft stop (SS) operation.

In addition, if the operation of the DC/DC converter 10 is stopped at the predetermined time, an ON/ON overlap time may be provided at a timing of an ON/OFF switching of driving pulses of the synchronous rectification MOS transistor $Q_{M2F}$ and the refluxing MOS transistor $Q_{M2R}$, thereby alleviating dead time and preventing an overvoltage from being produced in the drains of the synchronous rectification MOS transistor $Q_{M2F}$ and the refluxing MOS transistor $Q_{M2R}$.

As shown in FIG. 3, a line voltage $E_L$ is applied to the input of the DC/DC converter 10 according to some embodiments.

The DC/DC converter 10 of FIG. 3 may include an output inductor L connected between the secondary output of the transformer 15 and the output of the DC/DC converter 10, and an output capacitor $C_O$ connected between the output of the DC/DC converter 10 and the ground potential.

In addition, as shown in FIG. 3, the DC/DC converter 10 may include an auxiliary MOS transistor $Q_{MAUX}$ connected in series between the primary inductance L1 of the transformer 15 and the ground potential via a capacitor $C_t$ and connected in parallel to the main MOS transistor $Q_{MMAIN}$.

The controller 30 may be connected to the auxiliary MOS transistor $Q_{MAUX}$. If the operation of the DC/DC converter 10 is stopped at the predetermined time, the controller 30 may stop the auxiliary MOS transistor $Q_{MAUX}$ by the soft stop operation after the lapse of the predetermined period of time, in synchronization with the synchronous rectification MOS transistor $Q_{M2F}$ and the refluxing MOS transistor $Q_{M2R}$.

Since the auxiliary MOS transistor $Q_{MAUX}$ functions as an auxiliary switch for active clamping and is connected in parallel to the main MOS transistor $Q_{MMAIN}$, it has an effect of a snubber action of the main MOS transistor $Q_{MMAIN}$ and a magnetic flux reset action of the transformer 15.

In addition, the controller 30 may be connected to the refluxing MOS transistor $Q_{M2R}$ and control the refluxing MOS transistor $Q_{M2R}$.

In addition, the controller 30 may be connected to the auxiliary MOS transistor $Q_{MAUX}$ and control the auxiliary MOS transistor $Q_{MAUX}$.

In addition, the controller 30 may be connected to a gate of the synchronous rectification MOS transistor $Q_{M2F}$ via a first insulating transformer 20.

In addition, the controller 30 may be connected to a gate of the refluxing MOS transistor $Q_{M2R}$ via a second insulating transformer 22.

The soft stop operation may be performed by controlling a duty ratio of a pulse width in a PWM (Pulse Width Modulation) scheme.

(Control Circuit Portion)

In the DC/DC converter 10 of FIG. 3, the controller 30 disposed at the primary side may be connected to the main MOS transistor $Q_{MMAIN}$ and the auxiliary MOS transistor $Q_{MAUX}$ and control the input currents and the output currents thereof.

In the DC/DC converter 10 of FIG. 3, a control circuit portion 40 for controlling the synchronous rectification MOS transistor $Q_{M2F}$ and the refluxing MOS transistor $Q_{M2R}$ disposed in the secondary side from the controller 30 disposed in the primary side is indicated by a dotted line in FIG. 3. That is, the control circuit portion 40 includes the controller 30 disposed at the primary side, the first insulating transformer 20 connected to the controller 30 via a capacitor $C_{11}$, the synchronous rectification MOS transistor $Q_{M2F}$ connected to the first insulating transformer 20 via a capacitor $C_{12}$ and a driver 24, the second insulating transformer 22 connected to the controller 30 via a capacitor $C_{21}$, and the refluxing MOS transistor $Q_{M2R}$ connected to the second insulating transformer 22 via a capacitor $C_{22}$ and a driver 26. In addition, diodes D1 and D2 are connected between an input of the driver 24 and the ground potential and between an input of the driver 26 and the ground potential, respectively.

The control circuit portion 40 is not limited to the configuration shown in FIG. 3 so long as the controller 30 can control the synchronous rectification MOS transistor $Q_{M2F}$ and the refluxing MOS transistor $Q_{M2R}$ disposed at the secondary side. For example, typical insulating circuits, capacitors, photo-couplers and so on may be used instead of the insulating transformers 20 and 22. In addition, a bidirectional transformer or a bidirectional element attached with an insulating driver may be used.

Figure 4:
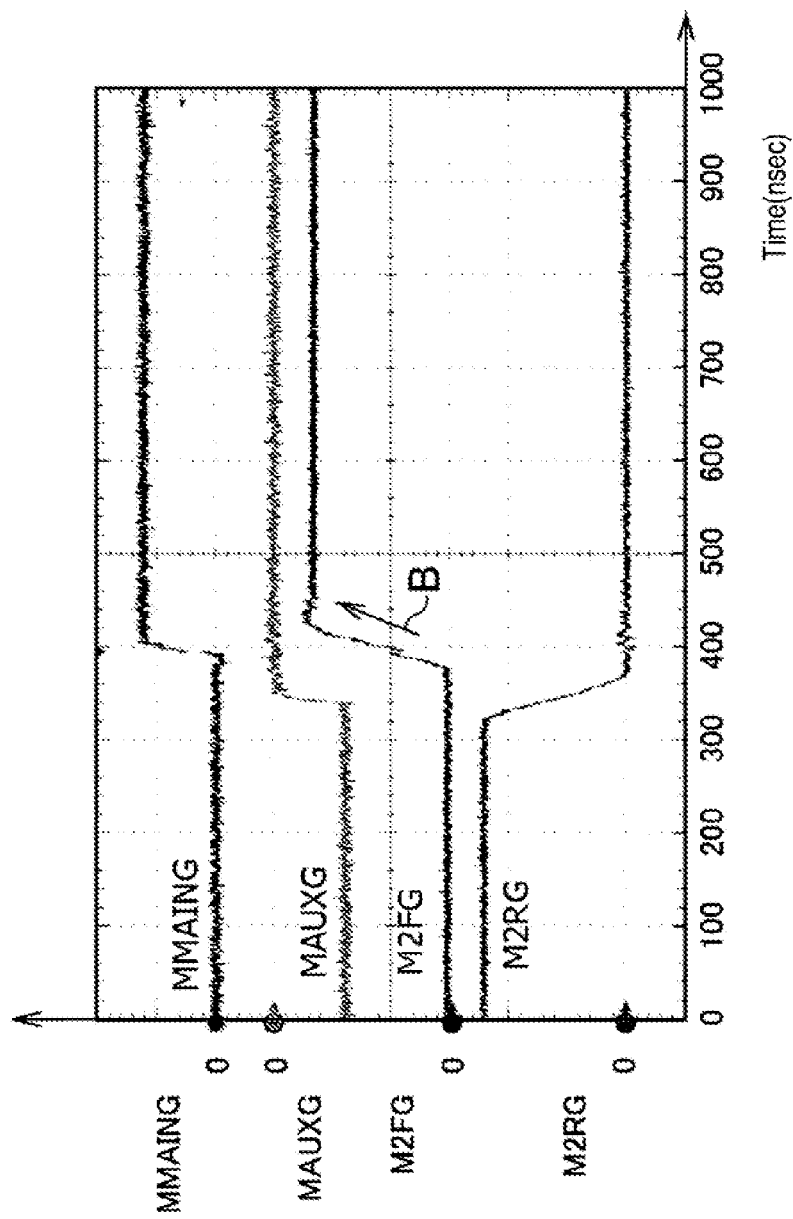
FIG. 4 is a view showing an exemplary operation waveform of the DC/DC converter according to some embodiments.

FIG. 4 shows an exemplary operation waveform of the DC/DC converter 10 of FIG. 3.

In operation of the DC/DC converter 10 of FIG. 3, when gate voltages $M_{MAING}$ and $M_{AUXG}$ for driving the main MOS transistor $Q_{MMAIN}$ and the auxiliary MOS transistor $Q_{MAUX}$ respectively are supplied from the controller 30, gate voltages of the synchronous rectification MOS transistor $Q_{M2F}$ and the refluxing MOS transistor $Q_{M2R}$ show a transient response operation denoted by M2FG and M2RG, respectively, as shown in FIG. 4.

Since the DC/DC converter 10 of FIG. 3 employs the control driving system using the controller 30 disposed at the primary side to control the synchronous rectification MOS transistor $Q_{M2F}$ and the refluxing MOS transistor $Q_{M2R}$ disposed at the secondary side, it is possible to prevent parasitic capacitance and ON resistance from being increased, as compared to the comparative example of FIG. 1 employing the self-driving system. Accordingly, the gate voltages M2FG and M2RG of the synchronous rectification MOS transistor $Q_{M2F}$ and the refluxing MOS transistor $Q_{M2R}$ as shown in FIG. 4 can be raised faster than those shown in FIG. 2 (illustrating the comparative example). In particular, since the controller 30 drives the synchronous rectification MOS transistor $Q_{M2F}$ directly, the raising of the gate voltage M2FG of the synchronous rectification MOS transistor $Q_{M2F}$ is accelerated.

Figure 24:
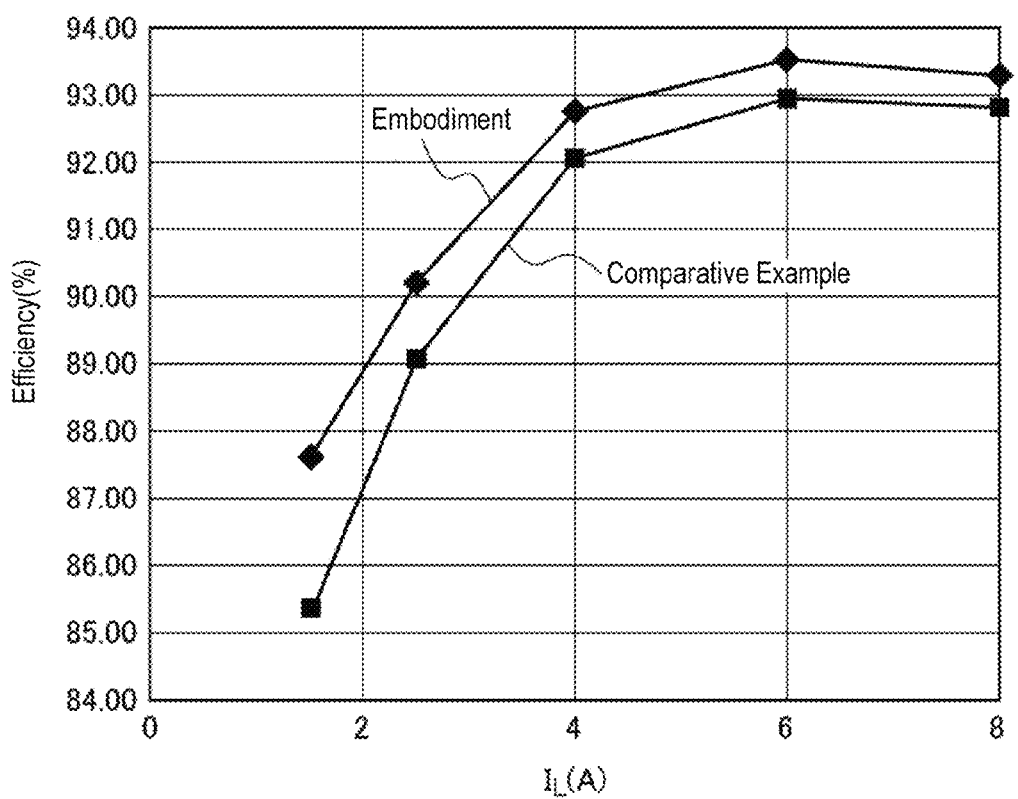
FIG. 24 shows a graphical representation of a relationship between power conversion efficiency versus a load current $I_L$ of the DC/DC converter of FIG. 3 and the DC/DC converter according to the comparative example.

As a result, as shown in FIG. 24 which will be described later, power conversion efficiency of the DC/DC converter 10 according to the embodiment can be higher by about 0.5% to about 2% than that of the comparative example.

(Stop Operation Method)

In the synchronous rectification type DC/DC converter 10 of FIG. 3 employing the control driving system, if an operation of the DC/DC converter 10 is stopped at predetermined time $t_S$, as the reset auxiliary MOS transistor $Q_{MAUX}$ at the primary side and the synchronous rectification MOS transistor $Q_{M2F}$ at the secondary side continue switching for a predetermined period of time without instantly stopping the switching despite the main MOS transistor $Q_{MMAIN}$ at the primary side being instantly turned off, it is possible to prevent an overcurrent from flowing from the output at the secondary side into the refluxing MOS transistor $Q_{M2R}$ on the secondary side.

At this time, if dead time $\Delta t_D$ is present at a timing of the ON/OFF switching of the synchronous rectification MOS transistor $Q_{M2F}$ and the refluxing MOS transistor $Q_{M2R}$ at the secondary side, as in a normal operation, an overcurrent may occur in drain terminals of the synchronous rectification MOS transistor $Q_{M2F}$ and the refluxing MOS transistor $Q_{M2R}$. In this case, it is possible to prevent an overvoltage by alleviating the dead time $\Delta t_D$ and providing ON-ON overlap time $\Delta t_{OL}$.

By employing the operation method of the synchronous rectification type DC/DC converter 10 of FIG. 3 employing the control driving system, the synchronous rectification MOS transistor $Q_{M2F}$ at the secondary side can be controlled from the primary side without using a clamping MOS transistor and thus the problem of overcurrent and overvoltage and the problem of a parasitic capacitance increase and delay in raising the gate voltage of the clamping MOS transistor can be prevented, which can result in increased power efficiency.

More specifically, the synchronous rectification type DC/DC converter 10 of FIG. 3 employing the control driving system may include the transformer 15 interposed between the input and the output of the DC/DC converter 10, the main MOS transistor $Q_{MMAIN}$ connected in series between the primary inductance L1 of the transformer 15 and the ground potential, the auxiliary MOS transistor $Q_{MAUX}$ connected in series between the primary inductance L1 of the transformer 15 and the ground potential via the capacitor $C_t$ and connected in parallel to the main MOS transistor $Q_{MMAIN}$ at the primary side, the synchronous rectification MOS transistor $Q_{M2F}$ connected in series between the secondary inductance L2 of the transformer 15 and the ground potential, the refluxing MOS transistor $Q_{M2R}$ which is connected between the secondary output of the transformer 15 and the ground potential and is capable of refluxing the output current, and the controller 30 capable of controlling the main MOS transistor $Q_{MMAIN}$, the auxiliary MOS transistor $Q_{MAUX}$, the synchronous rectification MOS transistor $Q_{M2F}$ and the refluxing MOS transistor $Q_{M2R}$.

—Overcurrent Prevention—

The stop operation method of the DC/DC converter 10 of FIG. 3 includes a step of turning off the main MOS transistor $Q_{MMAIN}$ at a first timing; a step of continuing switching of the auxiliary MOS transistor $Q_{MAUX}$, the synchronous rectification MOS transistor $Q_{M2F}$ and the refluxing MOS transistor $Q_{M2R}$ for a predetermined period of time without stopping the auxiliary MOS transistor $Q_{MAUX}$, the synchronous rectification MOS transistor $Q_{M2F}$ and the refluxing MOS transistor $Q_{M2R}$; and a step of turning off the auxiliary MOS transistor $Q_{MAUX}$, the synchronous rectification MOS transistor $Q_{M2F}$ and the refluxing MOS transistor $Q_{M2R}$ after a lapse of a predetermined period of time, so that an overcurrent can be prevented from being flown into the refluxing MOS transistor $Q_{M2R}$.

—Overvoltage Prevention—

The stop operation method of the DC/DC converter 10 of FIG. 3 includes a step of turning off the main MOS transistor $Q_{MMAIN}$ at a first timing; a step of continuing switching of the auxiliary MOS transistor $Q_{MAUX}$, the synchronous rectification MOS transistor $Q_{M2F}$ and the refluxing MOS transistor $Q_{M2R}$ for a predetermined period of time without stopping the auxiliary MOS transistor $Q_{MAUX}$, the synchronous rectification MOS transistor $Q_{M2F}$ and the refluxing MOS transistor $Q_{M2R}$; and a step of turning off the auxiliary MOS transistor $Q_{MAUX}$, the synchronous rectification MOS transistor $Q_{M2F}$ and the refluxing MOS transistor $Q_{M2R}$ after the lapse of the predetermined period of time, so that dead time can be alleviated by providing an ON-ON overlap time at a timing of ON/OFF switching of the synchronous rectification MOS transistor $Q_{M2F}$ and the refluxing MOS transistor $Q_{M2R}$ and an overvoltage can be prevented from being generated in drains of the synchronous rectification MOS transistor $Q_{M2F}$ and the refluxing MOS transistor $Q_{M2R}$.

In addition, in the stop operation method of the DC/DC converter 10 of FIG. 3, the step of continuing the switching for the predetermined period of time may include performing a soft stop (SS) operation by PWM control.

The stop operation method of the DC/DC converter 10 of FIG. 3 can be applied to prevent abnormal overcurrent and overvoltage which may occur in a circuit at the secondary side in a stop operation.

Although the stop operation method of the DC/DC converter 10A according to the comparative example of FIG. 1 includes a soft stop operation (also referred to as "SS operation") of only the auxiliary MOS transistor $Q_{MAUX}$ at the primary side, the stop operation method of the DC/DC converter 10 of FIG. 3 includes the SS operation of the synchronous rectification MOS transistor $Q_{M2F}$ and the refluxing MOS transistor $Q_{M2R}$ at the secondary side as well as the auxiliary MOS transistor $Q_{MAUX}$ at the primary side.

As the DC/DC converter 10 of FIG. 3 employs the control driving system, it is possible to reduce rising time/falling time of the synchronous rectification MOS transistor $Q_{M2F}$ and the refluxing MOS transistor $Q_{M2R}$ and facilitate the SS operation at the primary and secondary sides and the optimal adjustment of dead time $\Delta t_D$, which can result in prevention of an overcurrent which may be generated in a circuit at the secondary side.

Control Driving System

Comparative Example

—Overcurrent Generation Mechanism in a Stop Operation—

Figure 5:
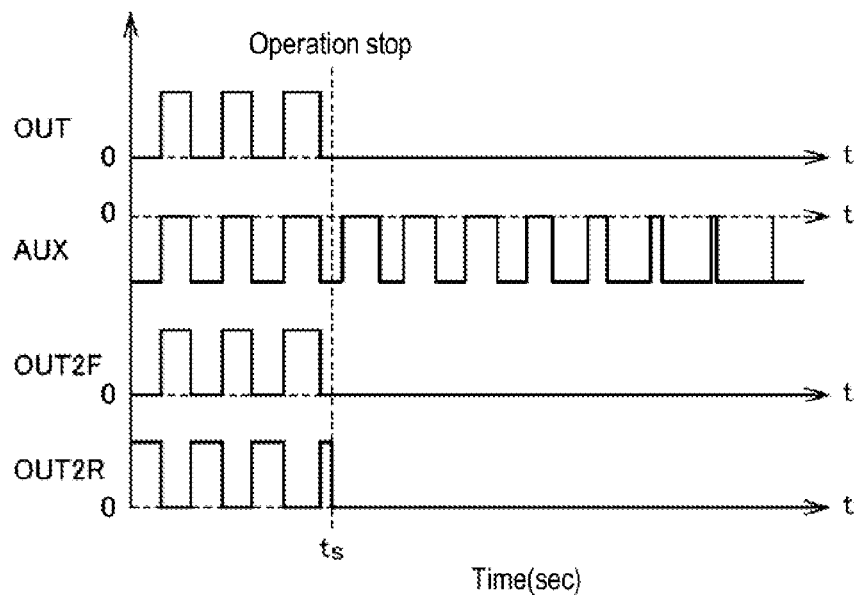
FIG. 5 shows operation waveforms for illustrating a comparative example of a stop operation in a synchronous rectification type DC/DC converter of FIG. 1.
Figure 6:
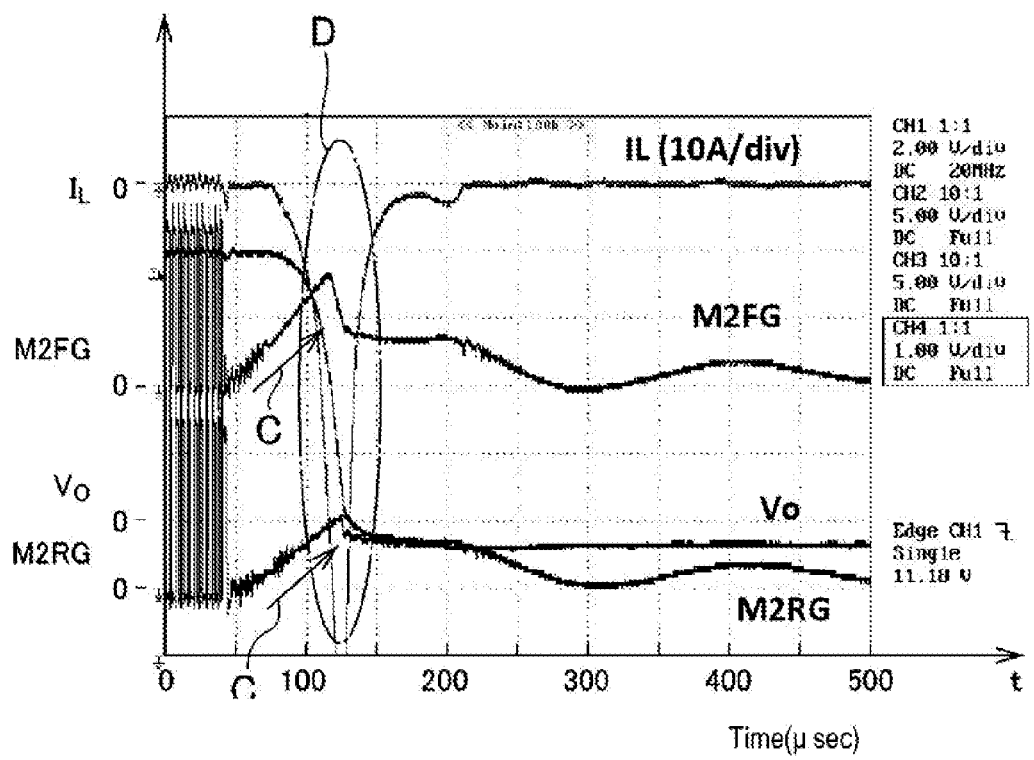
FIG. 6 shows examples of operation waveforms in the stop operation corresponding to FIG. 5.

FIG. 5 shows operation waveforms for illustrating a comparative example of a stop operation when an operation of the DC/DC converter is stopped in a synchronous rectification type DC/DC converter employing a control driving system. FIG. 6 shows examples of operation waveforms in the stop operation corresponding to FIG. 5. In the comparative example of the stop operation method of the DC/DC converter by the control driving system, an SS operation is performed only for the auxiliary MOS transistor $Q_{MAUX}$. In particular, as shown in FIG. 5, if the operation of the DC/DC converter is stopped at time $t_S$, the controller 30 stops a pulse waveform OUT for driving the main MOS transistor $Q_{MMAIN}$, a pulse waveform OUT2F for driving the synchronous rectification MOS transistor $Q_{M2F}$, and a pulse waveform OUT2R for driving the refluxing MOS transistor $Q_{M2R}$ at once. On the other hand, the auxiliary MOS transistor $Q_{MAUX}$ at the primary side controls a duty cycle of pulse width in a PWM scheme according to the SS operation such that the pulse width is gradually narrowed and stopped after a lapse of a predetermined period of time.

In the comparative example of the stop operation of the DC/DC converter employing the control driving system, a load current $I_L$ flown into the output inductor L may have a waveform to cause a reverse overcurrent at a timing of the operation stop, as indicated by a portion D in FIG. 6. A peak value of this overcurrent may be, for example, about 70 A.

In addition, in the comparative example of the stop operation of the DC/DC converter employing the control driving system, after switching stops, gate floating is observed in the gate voltage M2FG of the synchronous rectification MOS transistor $Q_{M2F}$ and the gate voltage M2RG of the refluxing MOS transistor $Q_{M2R}$, as indicated by an arrow C in FIG. 6. That is, when the gate voltage M2FG of the synchronous rectification MOS transistor $Q_{M2F}$ and the gate voltage M2RG of the refluxing MOS transistor $Q_{M2R}$ are raised, the load current $I_L$ may be observed as an overcurrent.

Figure 7:
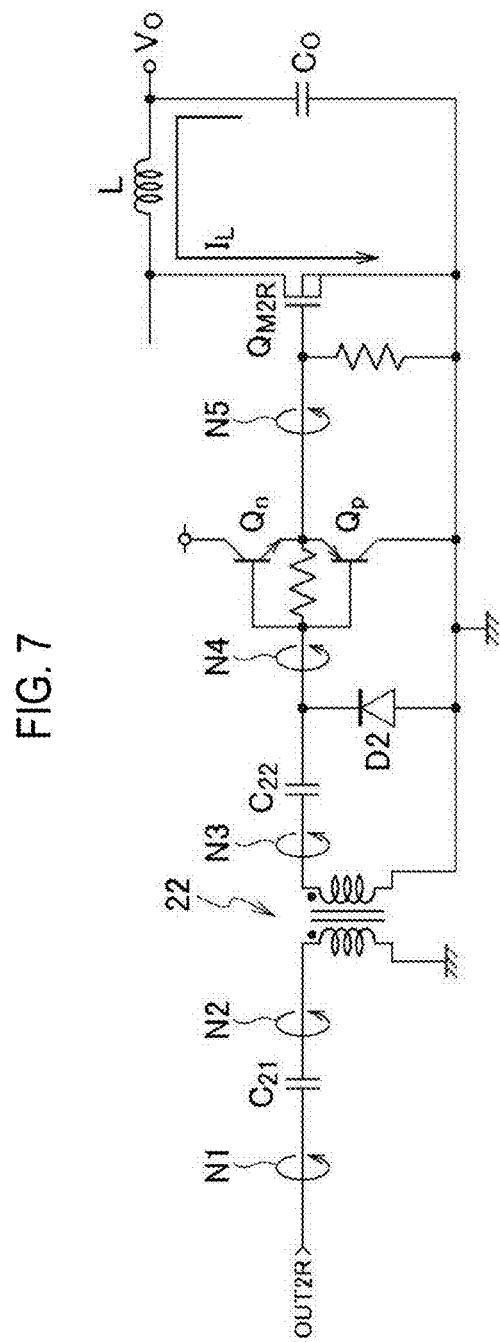
FIG. 7 is a circuit configuration of a control driving system for controlling a refluxing MOS transistor $Q_{M2R}$ from a controller at a primary side using an insulating transformer in a synchronous rectification type DC/DC converter employing the control driving system.

FIG. 7 is a partially enlarged circuit configuration for illustrating an operation of controlling the refluxing MOS transistor $Q_{M2R}$ at the secondary side from the controller at the primary side using the insulating transformer 22 in the synchronous rectification type DC/DC converter 10 of FIG. 3 employing the control driving system. In FIG. 7, a driver unit corresponding to the driver 26 of FIG. 3 is constructed by bipolar transistors $Q_p$ and $Q_n$.

Even in the synchronous rectification type DC/DC converter employing the control driving system, when the operation of the DC/DC converter 10 is stopped, an abnormal overcurrent or overvoltage may occur in the secondary side in the comparative example.

Figure 8:
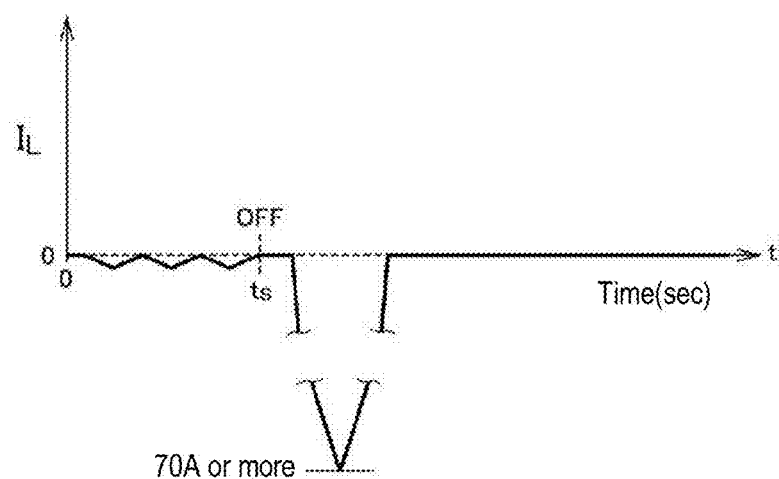
FIG. 8 shows a waveform illustrating an overcurrent flow into an output inductor L when a gate voltage of the refluxing MOS transistor at a secondary side is raised in FIG. 7.

FIG. 8 shows a schematic waveform of overcurrent flow into the output inductor L when the gate voltage M2RG of the refluxing MOS transistor $Q_{M2R}$ on the secondary side in FIG. 7 is increased. In the synchronous rectification type DC/DC converter employing the control driving system, since energy is stored in the insulating transformer 22, if the operation of the DC/DC converter 10 is stopped at time $t_S$, the gate voltage M2RG of the refluxing MOS transistor $Q_{M2R}$ at the secondary side is transiently raised and an abnormal reverse overcurrent occurs in the output, as shown in FIG. 8. That is, if the operation of the DC/DC converter 10 is stopped at time $t_S$, energy stored in the insulating transformer 22 is emitted and an abnormal current occurs accordingly.

Figure 9A:
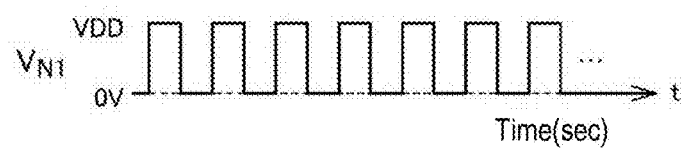
FIGS. 9A and 9B show a waveform in continuous operation and a waveform in stop operation, respectively, when a node N1 in FIG. 7 has a voltage $V_{N1}$.
Figure 9B:
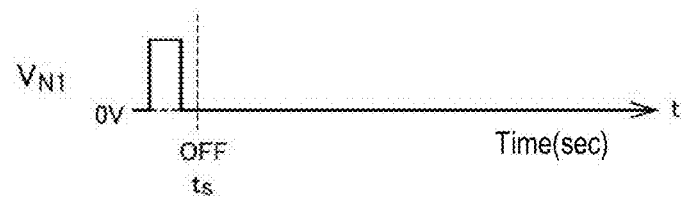

When a node N1 in FIG. 7 has a voltage $V_{N1}$, a waveform in continuous operation is as shown in FIG. 9A and a waveform in stop operation at time $t_S$ is as shown in FIG. 9B.

Figure 10A:
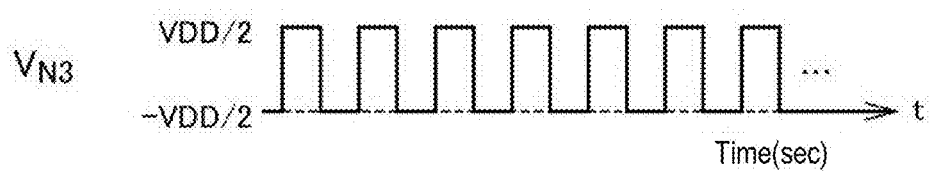
FIGS. 10A and 10B show a waveform in continuous operation and a waveform in stop operation, respectively, when a node N3 in FIG. 7 has a voltage $V_{N3}$.
Figure 10B:
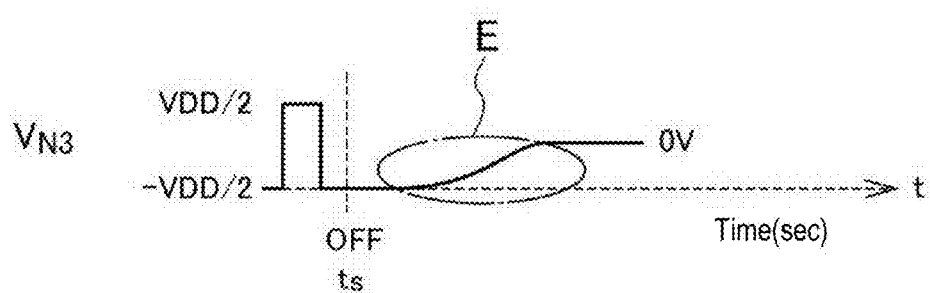

When a node N3 in FIG. 7 has a voltage $V_{N3}$, a waveform in continuous operation is as shown in FIG. 10A and a waveform in stop operation at time $t_S$ is as shown in FIG. 10B. An average DC level of the voltage $V_{N3}$ of the node N3 is switched to 0V as shown in FIG. 10A. When the operation of the DC/DC converter 10 is stopped at time $t_S$, the voltage $V_{N3}$ of the node N3 is converged to 0V from negative swing by energy stored in the insulating transformer 22, as shown in FIG. 10B. Although a high level of the voltage $V_{N3}$ is VDD/2 and a low level thereof is −VDD/2 in FIG. 10A, this corresponds to a duty factor of 50%. If the duty factor is not 50%, a potential is determined such that an average of the high and low levels of the voltage $V_{N3}$ becomes 0V.

Figure 11A:
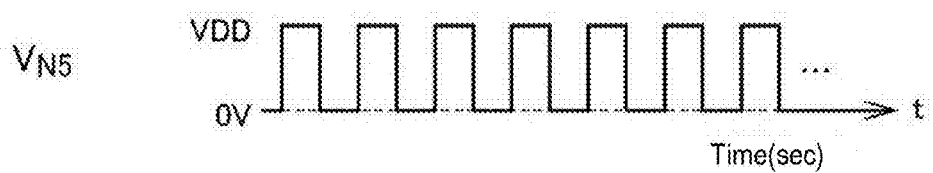
FIGS. 11A and 11B show a waveform in continuous operation and a waveform in stop operation, respectively, when a node N5 in FIG. 7 has a voltage $V_{N5}$.
Figure 11B:
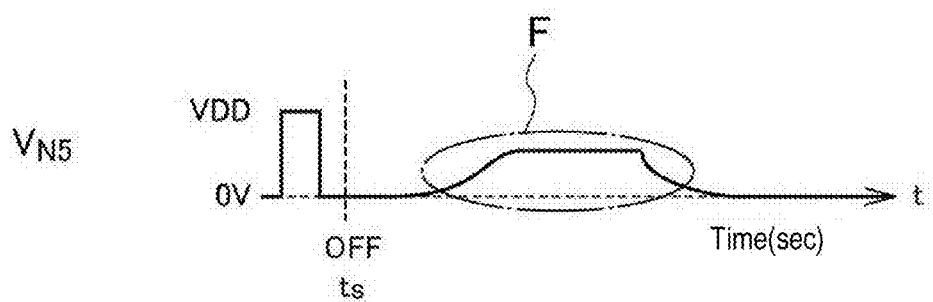

When a node N5 in FIG. 7 has a voltage $V_{N5}$, a waveform in continuous operation is as shown in FIG. 11A and a waveform in stop operation at time $t_S$ is as shown in FIG. 11B. When the operation of the DC/DC converter 10 is stopped at time $t_S$, the voltage $V_{N5}$ of the node N5 is raised and then reaches 0V in the course of convergence to 0V, as shown in FIG. 11B.

Overcurrent Prevention Operation

Embodiment

Figure 12:
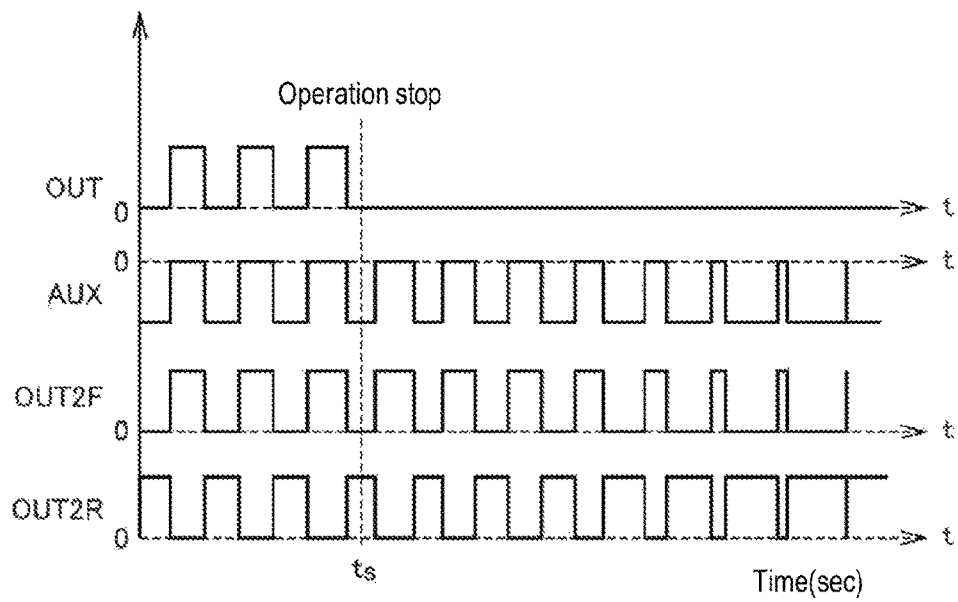
FIG. 12 shows operation waveforms for illustrating an example of stop operation capable of preventing an overcurrent in the DC/DC converter of FIG. 3.

FIG. 12 shows operation waveforms for illustrating an example of stop operation capable of preventing an overcurrent in the DC/DC converter 10 of FIG. 3.

Figure 13:
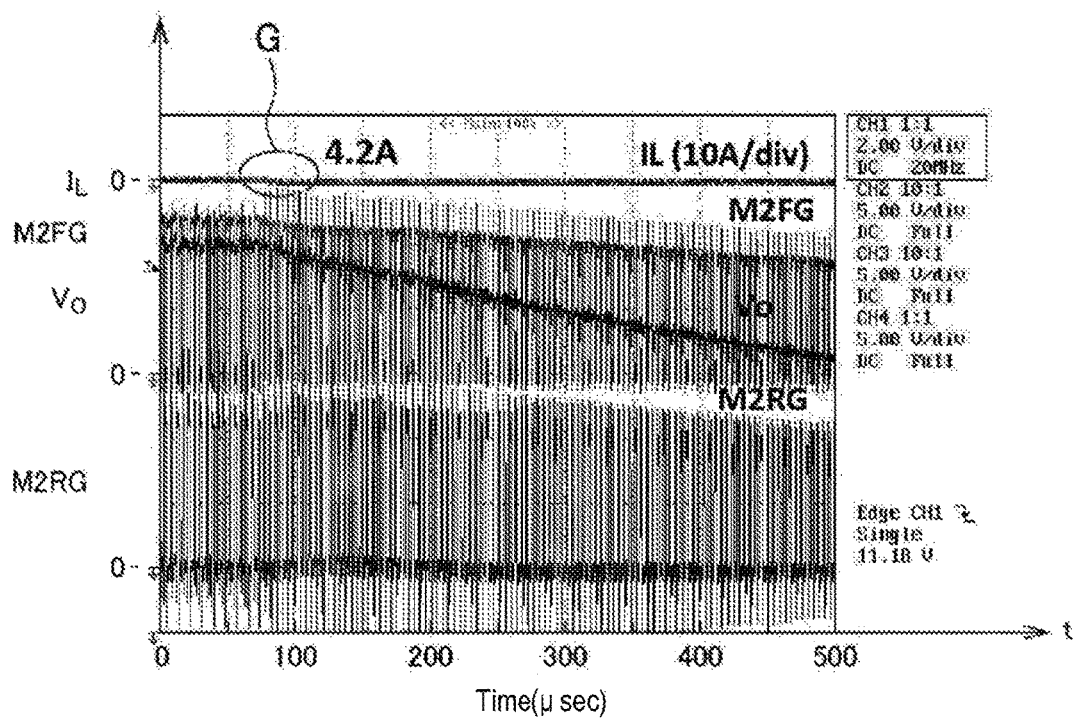
FIG. 13 shows examples of operation waveforms in the stop operation (overcurrent prevention effect) corresponding to FIG. 12 in the DC/DC converter of FIG. 3.

FIG. 13 shows examples of operation waveforms in the stop operation corresponding to FIG. 12 (overcurrent prevention effect). In the stop operation method of the DC/DC converter 10 according to the embodiment, the SS operation is performed for the synchronous rectification MOS transistor $Q_{M2F}$ and the refluxing MOS transistor $Q_{M2R}$ as well as the auxiliary MOS transistor $Q_{MAUX}$ at the primary side.

As shown in FIG. 12, when the operation of the DC/DC converter 10 is stopped at time $t_S$, the controller 30 stops a pulse waveform OUT for driving the main MOS transistor $Q_{MMAIN}$. On the other hand, the controller 30 controls duty cycles of pulse width of a pulse waveform OUT2F for driving the synchronous rectification MOS transistor $Q_{M2F}$, a pulse waveform OUT2R for driving the refluxing MOS transistor $Q_{M2R}$ and a pulse waveform AUX for driving the auxiliary MOS transistor $Q_{MAUX}$ in a PWM scheme by the SS operation such that the pulse widths are gradually narrowed and stopped after a lapse of a predetermined period of time. Here, the predetermined period of time is, for example, about 1 msec.

In the DC/DC converter 10 of FIG. 3, as indicated by a portion G in FIG. 13, no reverse overcurrent is observed in a waveform of the load current $I_L$ flown into the output inductor L at a timing of the operation stop.

In addition, in the DC/DC converter 10 of FIG. 3, a continuous waveform by PWM control is observed in the gate voltage M2FG of the synchronous rectification MOS transistor $Q_{M2F}$ and the gate voltage M2RG of the refluxing MOS transistor $Q_{M2RG}$ at the timing of operation stop but rising of the gate voltage M2FG of the synchronous rectification MOS transistor $Q_{M2F}$ and the gate voltage M2RG of the refluxing MOS transistor $Q_{M2RG}$ is not observed.

Figure 14:
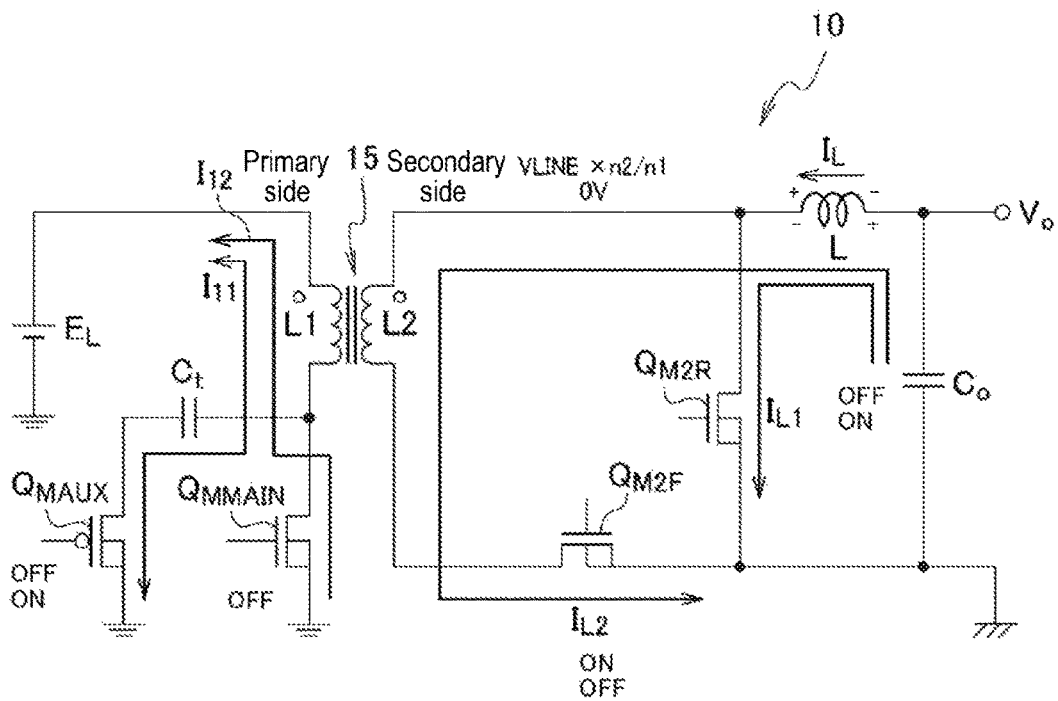
FIG. 14 is a circuit diagram for illustrating the overcurrent prevention operation in the DC/DC converter according to some other embodiments.

FIG. 14 shows circuit operation for illustrating an overcurrent prevention operation in the DC/DC converter 10 of FIG. 3.

Figure 15:
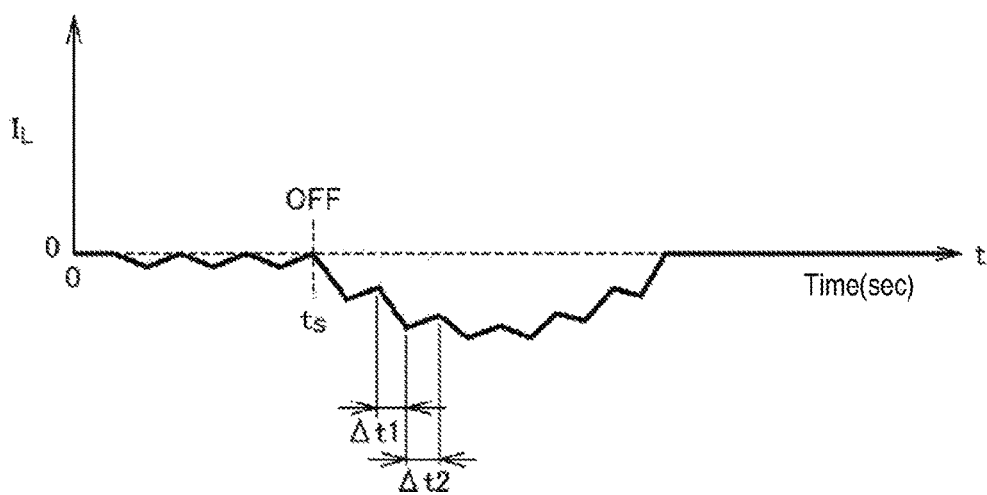
FIG. 15 shows an enlarged waveform of a load current flown into an output inductor L in continued switching of the synchronous rectification MOS transistor $Q_{M2F}$ and the refluxing MOS transistor $Q_{M2R}$ after turning-off the main MOS transistor $Q_{MMAIN}$ in the DC/DC converter of FIG. 3, for illustrating the overcurrent prevention effect in association with a region G in FIG. 13.

FIG. 15 shows a schematic enlarged waveform of the load current $I_L$ flown into the output inductor L in continued switching of the synchronous rectification MOS transistor $Q_{M2F}$ and the refluxing MOS transistor $Q_{M2R}$ after turning-off of the main MOS transistor $Q_{MMAIN}$ in the DC/DC converter 10 of FIG. 3. The waveform of FIG. 15 corresponds to the waveform for illustrating the overcurrent prevention effect in association with the region G in FIG. 13.

When the driving pulse OUT of the main MOS transistor $Q_{MMAIN}$ is stopped at time $t_S$, the main MOS transistor $Q_{MMAIN}$ is turned off to prevent a current $I_{12}$ from being flown through the main MOS transistor $Q_{MMAIN}$.

On the other hand, since the driving pulse AUX of the auxiliary MOS transistor $Q_{MAUX}$ repeats ON/OFF operation by the SS operation, a bidirectional current $I_{12}$ is flown through the auxiliary MOS transistor $Q_{MAUX}$. Similarly, the driving pulse OUT2F of the synchronous rectification MOS transistor $Q_{M2F}$ and the driving pulse OUT2R of the refluxing MOS transistor $Q_{M2R}$ repeat the ON/OFF operation by the SS operation, as shown in FIG. 12.

In FIG. 14, assuming that a current flow through the refluxing MOS transistor $Q_{M2R}$ is $I_{L1}$ and a current flow through the synchronous rectification MOS transistor $Q_{M2F}$ is $I_{L2}$, the load current $I_L$ flow through the output inductor L is represented by $I_{L1}+I_{L2}$. The load current $I_L$ flow through the output inductor L is switched when the refluxing MOS transistor $Q_{M2R}$ and the synchronous rectification MOS transistor $Q_{M2F}$ are turned on/off by the SS operation.

In FIG. 15, for example, the load current $I_L$ is increased in a phase of $\Delta t1$, whereas the load current $I_L$ is decreased in a phase of $\Delta t2$ to prevent increase in the current from the output at the secondary side, thereby preventing an overcurrent.

In the DC/DC converter 10 of FIG. 3, while continuously switching the refluxing MOS transistor $Q_{M2R}$ and the synchronous rectification MOS transistor $Q_{M2F}$ at the timing of operation stop, the SS operation is performed to decrease the duty of pulse width slowly. As a result, it is possible to suppress increase in the current from the output at the secondary side, thereby preventing an overcurrent.

Overvoltage Prevention Operation

Embodiment

Figure 16:
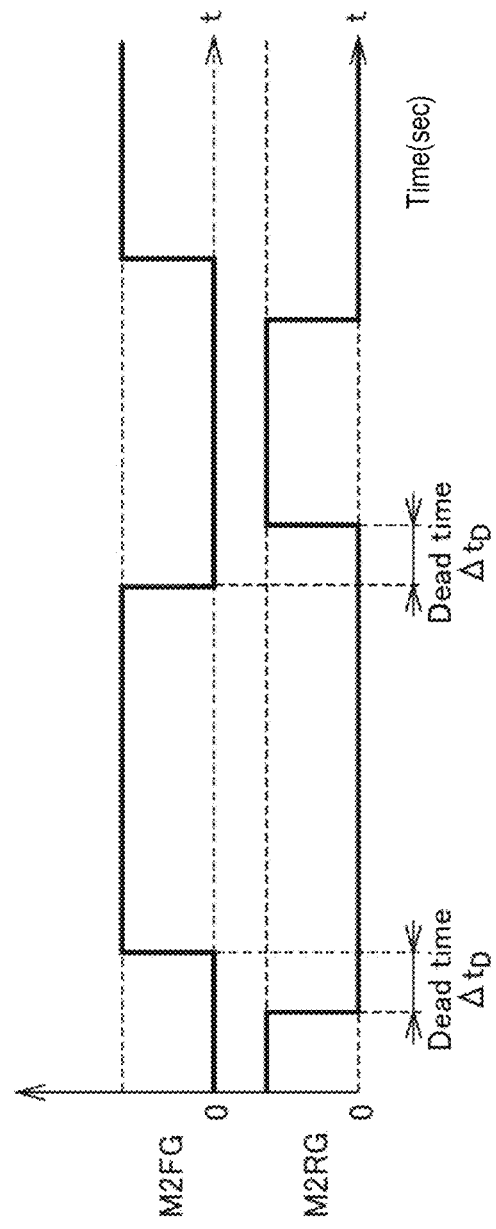
FIG. 16 shows examples of operation timing waveforms (having dead time $\Delta t_D$) of a gate voltage M2FG of the synchronous rectification MOS transistor $Q_{M2}$F at the secondary side and a gate voltage M2RG of the refluxing MOS transistor $Q_{M2R}$ at the secondary side in the DC/DC converter of FIG. 3.

FIG. 16 shows examples of operation timing waveforms (having dead time $\Delta t_D$) of the gate voltage M2FG of the synchronous rectification MOS transistor $Q_{M2}F$ at the secondary side and the gate voltage M2RG of the refluxing MOS transistor $Q_{M2R}$ at the secondary side in the DC/DC converter 10 of FIG. 3, according to some embodiments.

Figure 17:
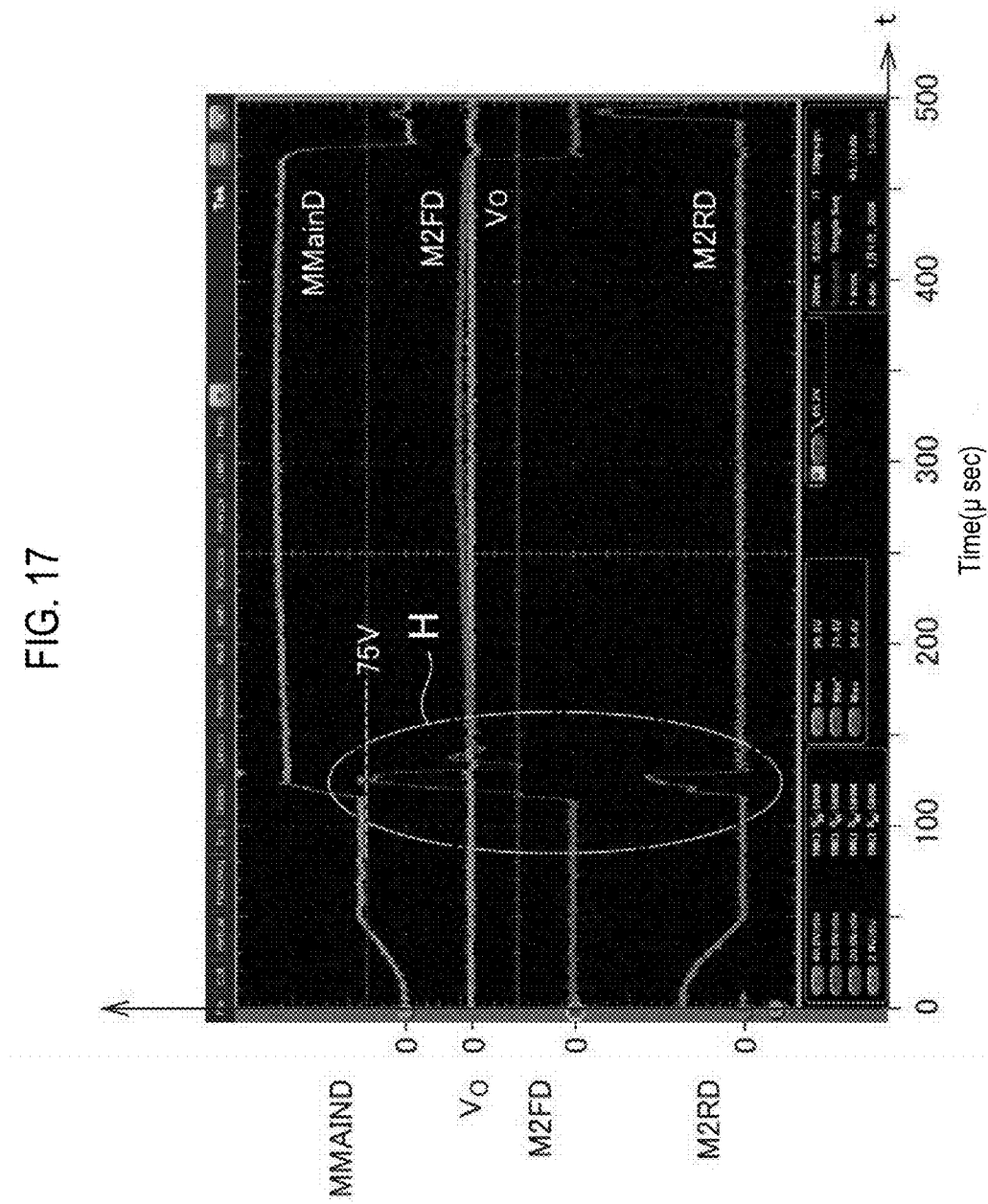
FIG. 17 shows examples of operation waveforms showing a state where an overvoltage occurs in a period of dead time $\Delta t_D$ in the stop operation in the DC/DC converter of FIG. 3.

FIG. 17 shows examples of operation waveforms showing a state where an overvoltage occurs in a period of dead time $\Delta t_D$ in the stop operation in the DC/DC converter 10 of FIG. 3, according to some embodiments. FIG. 17 also shows operation waveforms of a drain voltage MMAIND of the main MOS transistor $Q_{MMAIN}$, an output voltage $V_O$ of the DC/DC converter 10, a drain voltage M2FD of the synchronous rectification MOS transistor $Q_{M2F}$, and a drain voltage M2RD of the refluxing MOS transistor $Q_{M2R}$.

When the operation timings of the drain voltage M2FD of the synchronous rectification MOS transistor $Q_{M2F}$ and the drain voltage M2RD of the refluxing MOS transistor $Q_{M2R}$ have dead time $\Delta t_D$, a large voltage jump is observed in the waveforms of the drain voltage M2FD of the synchronous rectification MOS transistor $Q_{M2F}$ and the drain voltage M2RD of the refluxing MOS transistor $Q_{M2R}$, as indicated by a portion H in FIG. 17.

Figure 18:
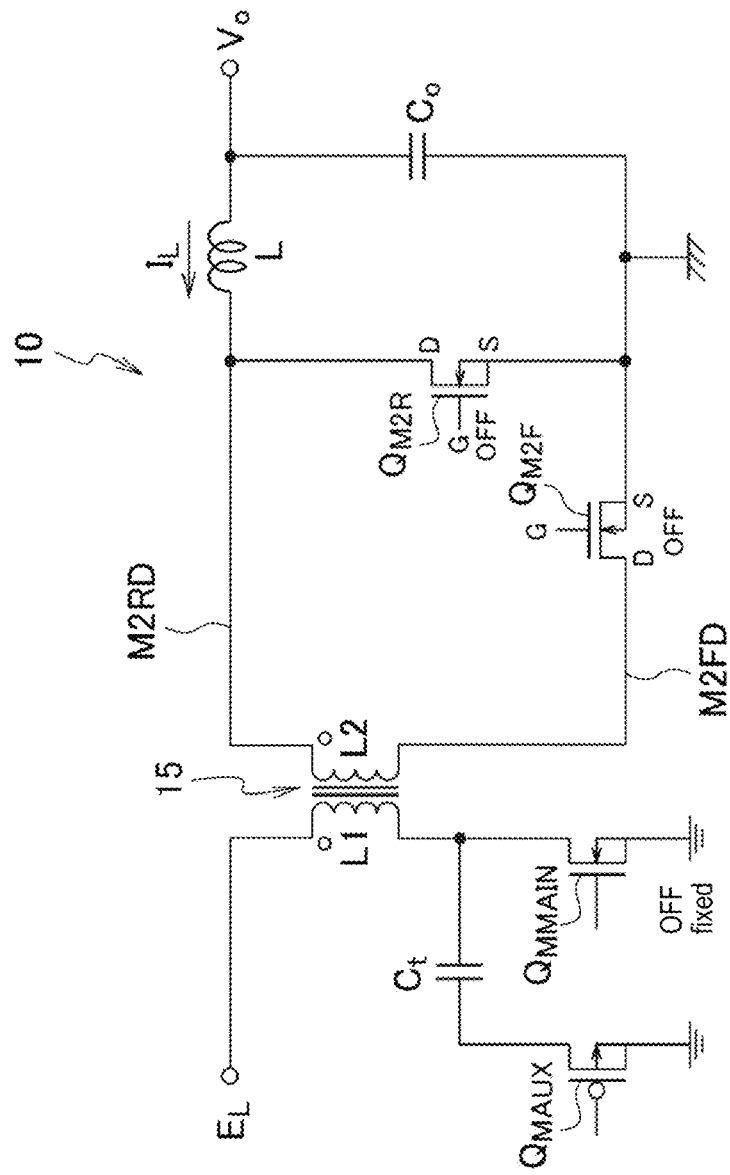
FIG. 18 is a circuit diagram for illustrating the operation of the synchronous rectification MOS transistor $Q_{M2F}$ at the secondary side and the refluxing MOS transistor $Q_{M2R}$ at the secondary side in the dead time $\Delta t_D$ in the DC/DC converter of FIG. 3.

FIG. 18 shows a circuit diagram for illustrating an operation of the synchronous rectification MOS transistor $Q_{M2F}$ at the secondary side and the refluxing MOS transistor $Q_{M2R}$ at the secondary side in the dead time $\Delta t_D$ in the DC/DC converter 10 of FIG. 3.

In the SS stop operation of the DC/DC converter 10 of FIG. 18, the main MOS transistor $Q_{MMAIN}$ is maintained at a turn-off state and the auxiliary MOS transistor $Q_{MAUX}$, the synchronous rectification MOS transistor $Q_{M2F}$ and the refluxing MOS transistor $Q_{M2R}$ at the secondary side repeat turning ON/OFF by the SS operation. In the SS stop operation, a reverse load current $I_L$ is flown through the output inductor L for a discharging process.

In the stop operation, particularly, in the dead time $\Delta t_D$ in which both of the synchronous rectification MOS transistor $Q_{M2F}$ and the refluxing MOS transistor $Q_{M2R}$ are in the turn-off state, the drain voltage M2FD of the synchronous rectification MOS transistor $Q_{M2F}$ and the drain voltage M2RD of the refluxing MOS transistor $Q_{M2R}$ are jumped as shown in FIG. 17. That is, in the stop operation, since a certain reverse current is flown through the inductor L for an output discharging process, an overvoltage is generated in the dead time $\Delta t_D$ period.

—Overlap Period $\Delta t_{OL}$—

Figure 19:
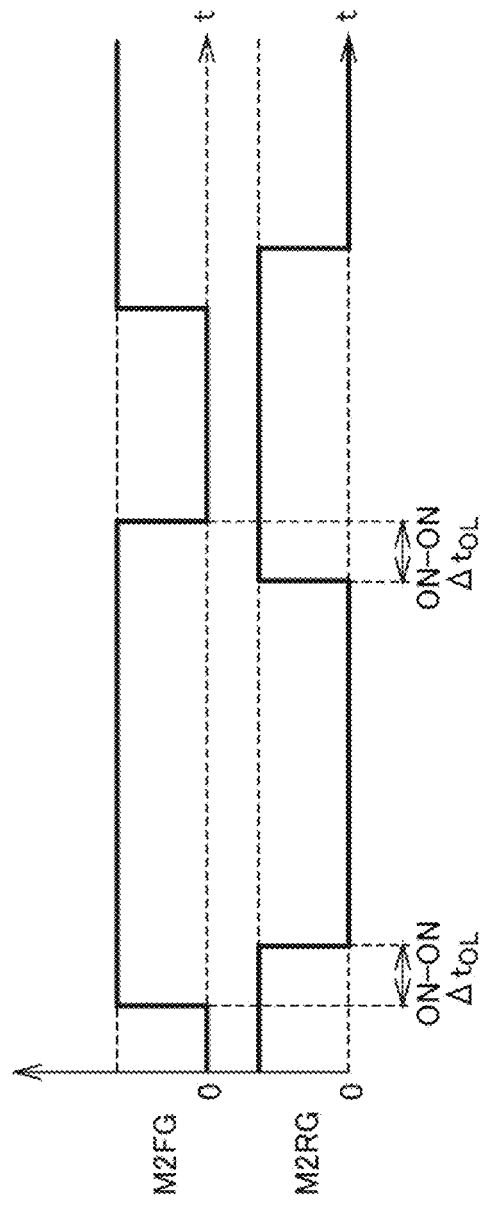
FIG. 19 shows examples of operation timing waveforms (having overlap time $\Delta t_{OL}$) of a gate voltage M2FG of the synchronous rectification MOS transistor $Q_{M2F}$ at the secondary side and a gate voltage M2RG of the refluxing MOS transistor $Q_{M2R}$ at the secondary side in the DC/DC converter of FIG. 3.

FIG. 19 shows examples of operation timing waveforms (having overlap period $\Delta t_{OL}$) of the gate voltage M2FG of the synchronous rectification MOS transistor $Q_{M2F}$ at the secondary side and the gate voltage M2RG of the refluxing MOS transistor $Q_{M2R}$ at the secondary side in the DC/DC converter 10 of FIG. 18.

Figure 20:
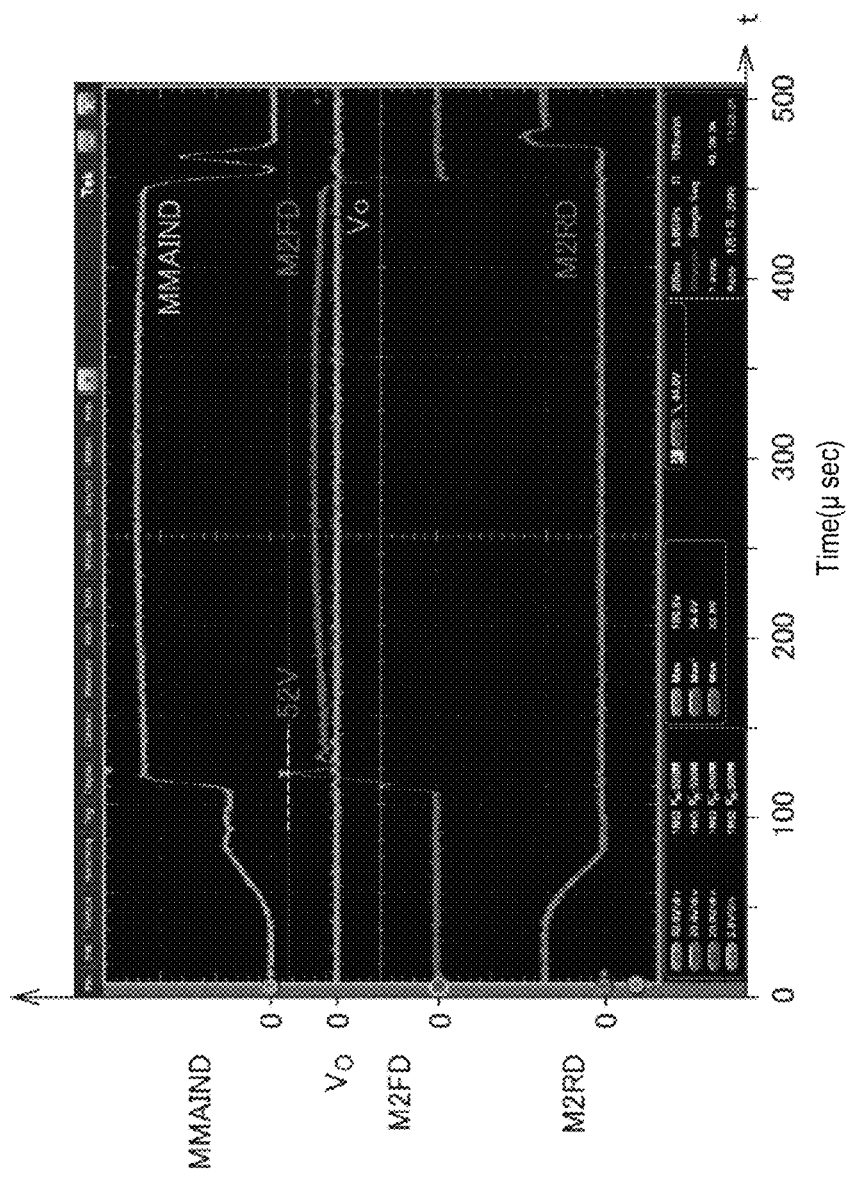
FIG. 20 shows examples of operation waveforms showing a state where an overvoltage is prevented in the stop operation by providing an overlap period $\Delta t_{OL}$ in the DC/DC converter of FIG. 3.

FIG. 20 shows examples of operation waveforms showing a state where an overvoltage is prevented in the stop operation by providing the overlap period $\Delta t_{OL}$ (overvoltage prevention effect) in the DC/DC converter 10 of FIG. 18. FIG. 20 also shows operation waveforms of a drain voltage MMAIND of the main MOS transistor $Q_{MMAIN}$, an output voltage $V_O$ of the DC/DC converter 10, a drain voltage M2FD of the synchronous rectification MOS transistor $Q_{M2F}$, and a drain voltage M2RD of the refluxing MOS transistor $Q_{M2R}$.

When the operation timings of the gate voltage M2FG of the synchronous rectification MOS transistor $Q_{M2F}$ and the gate voltage M2RG of the refluxing MOS transistor $Q_{M2R}$ have the overlap period $\Delta t_{OL}$ in which both the synchronous rectification MOS transistor $Q_{M2F}$ and the refluxing MOS transistor $Q_{M2R}$ are in an ON state, no voltage jump is observed in the waveforms of the drain voltage M2FD of the synchronous rectification MOS transistor $Q_{M2F}$ and the drain voltage M2RD of the refluxing MOS transistor $Q_{M2R}$, as shown in FIG. 20.

Figure 21:
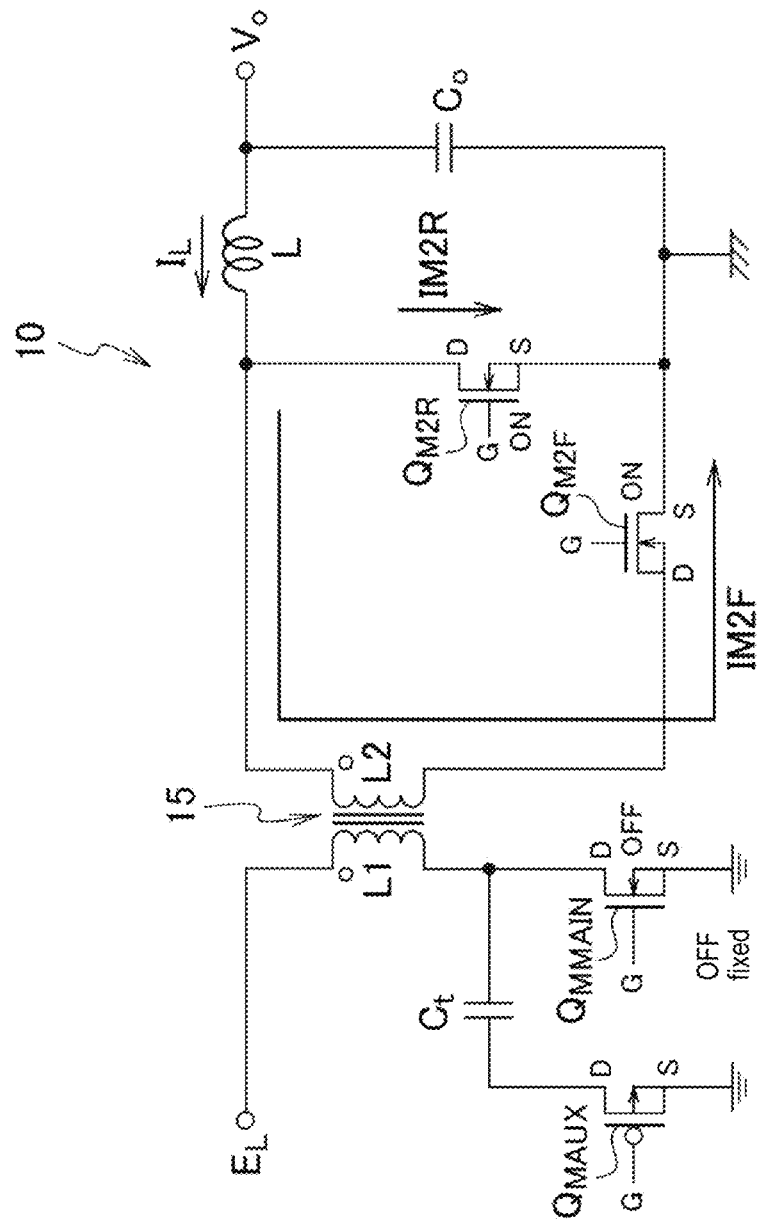
FIG. 21 is a circuit diagram for illustrating a soft stop operation to prevent an overvoltage in the stop operation by providing the overlap period $\Delta t_{OL}$ in the DC/DC converter of FIG. 3.

FIG. 21 shows a circuit diagram for illustrating a soft stop operation to prevent an overvoltage from being generated in the drain voltage M2FD of the synchronous rectification MOS transistor $Q_{M2F}$ and the drain voltage M2RD of the refluxing MOS transistor $Q_{M2R}$ in the stop operation by providing the overlap period $\Delta t_{OL}$ in the DC/DC converter 10 of FIG. 3.

In the SS stop operation of the DC/DC converter 10 of FIG. 21, the main MOS transistor $Q_{MMAIN}$ is maintained at a turn-off state and the auxiliary MOS transistor $Q_{MAUX}$, the synchronous rectification MOS transistor $Q_{M2F}$ and the refluxing MOS transistor $Q_{M2R}$ at the secondary side repeat turning ON/OFF by the SS operation. In the SS stop operation, a reverse load current $I_L$ is flown through the output inductor L for a discharging process.

It is possible to prevent an overvoltage by alleviating the dead time $\Delta t_D$ in which both of the synchronous rectification MOS transistor $Q_{M2F}$ and the refluxing MOS transistor $Q_{M2R}$ are in the turn-off state at the operation stop and providing the overlap period $\Delta t_{OL}$ in which both of the synchronous rectification MOS transistor $Q_{M2F}$ and the refluxing MOS transistor $Q_{M2R}$ are in the turn-on state.

In addition, in the overlap period $\Delta t_{OL}$ in which both of the synchronous rectification MOS transistor $Q_{M2F}$ and the refluxing MOS transistor $Q_{M2R}$ are in the turn-on state, assuming that a current flow through the refluxing MOS transistor $Q_{M2R}$ is $I_{M2R}$ and a current flow through the synchronous rectification MOS transistor $Q_{M2F}$ is $I_{M2F}$, as shown in FIG. 21, the load current $I_L$ is represented by $I_{M2R}+I_{M2F}$ and no overcurrent occurs due to the overlap period $\Delta t_{OL}$ when the refluxing MOS transistor $Q_{M2R}$ and the synchronous rectification MOS transistor $Q_{M2F}$ are turned on/off by the SS operation.

Figure 22:
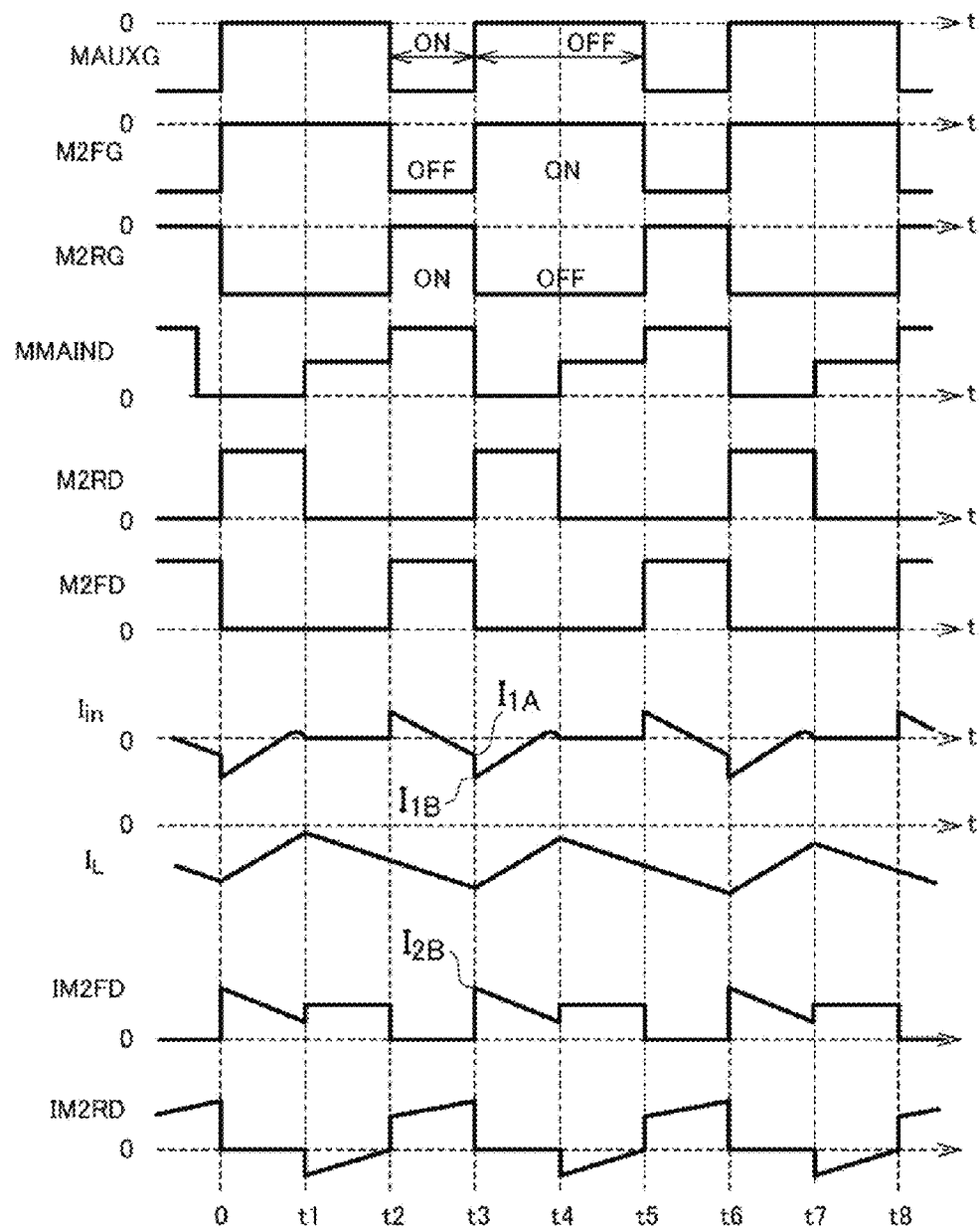
FIG. 22 shows examples of operation waveforms in the soft stop operation in the DC/DC converter of FIG. 21.

FIG. 22 shows examples of operation waveforms in the soft stop operation in the DC/DC converter 10 of FIG. 21.

FIG. 22 also shows operation waveforms of the gate voltage MAUXG of the auxiliary MOS transistor $Q_{MAUX}$, the gate voltage M2FG of the synchronous rectification MOS transistor $Q_{M2F}$, the gate voltage M2RG of the refluxing MOS transistor $Q_{M2R}$, the drain voltage MMAIND of the main MOS transistor $Q_{MMAIN}$, the drain voltage M2FD of the synchronous rectification MOS transistor $Q_{M2F}$, the drain voltage M2RD of the refluxing MOS transistor $Q_{M2R}$, a primary side input current $I_{in}$ of the DC/DC converter 10, the load current $I_L$ flown through the output inductor L, the drain current $I_{M2FD}$ of the synchronous rectification MOS transistor $Q_{M2F}$ and the drain current $I_{M2RD}$ of the refluxing MOS transistor $Q_{M2R}$, in which ON/OFF operation is repeated as shown.

Figure 23:
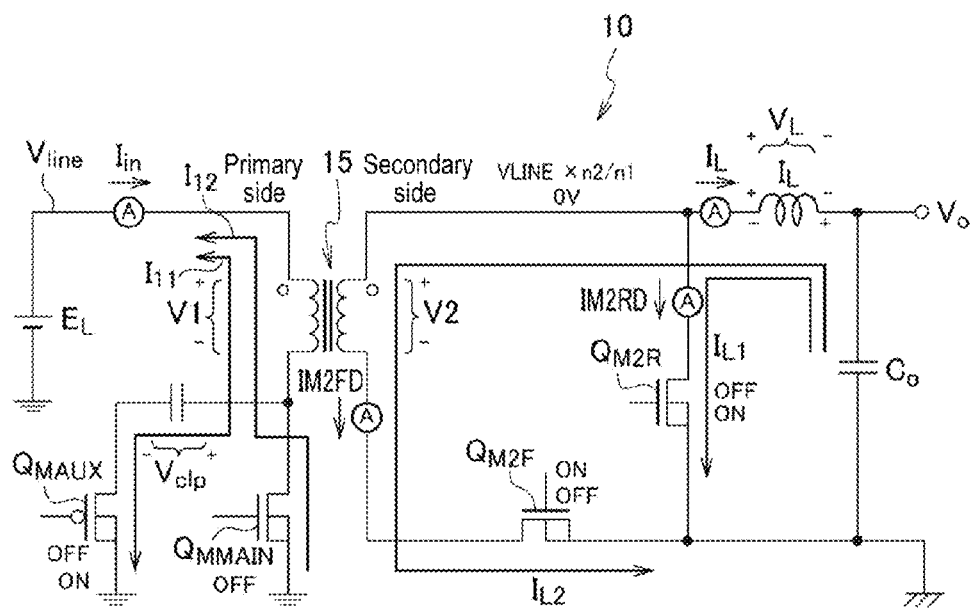
FIG. 23 is a circuit diagram for illustrating the soft stop operation in the DC/DC converter of FIG. 3.

FIG. 23 shows a circuit diagram for illustrating the soft stop operation in the DC/DC converter 10 of FIG. 3.

In FIG. 22, it is assumed that a period from time t2 to time t3 is state A, a period from time t3 to time t4 is state B and a period from time t4 to time t5 is state C.

In the soft stop operation, energy stored in the output capacitor $C_O$ and so on is released while repeating the following steps (a) to (c).

(a) In state A, a gate voltage is switched from state C and an excitation current is induced in the primary side by a stored magnetic flux.

(b) In state B, the synchronous rectification MOS transistor $Q_{M2F}$ is turned on and the refluxing MOS transistor $Q_{M2R}$ is turned off, thereby flowing the load current $I_L$ through the synchronous rectification MOS transistor $Q_{M2F}$. In the primary side, a reflected current from the secondary side is added to the excitation current excited in state A. In FIG. 22, the relationship of $I_{1B}=I_{1A}-(n2/n1)I_{2B}$ is established. Where, n1 represents the number of windings at the primary side of the transformer 15 and n2 represents the number of windings at the secondary side of the transformer 15. A conduction current at the primary side is flown through a body diode of the main MOS transistor $Q_{MMAIN}$ as a current conduction path. A positive voltage is applied as a voltage V1 (=Vline) across the primary side inductance L1 of the transformer 15 and the excitation current is accordingly increased. At this time, a voltage V2 (=(n2/n1)×Vline) across the secondary side inductance L2 is produced and a positive voltage $V_L$ (=V2−$V_O$) is applied to the output inductor L, thereby suppressing a discharging current (overcurrent prevention).

(c) In state C, when the excitation current of the transformer 15 is increased to match the reflected current from the secondary side (Iin=0), the drain voltage VMAIND of the main MOS transistor $Q_{MMAIN}$ is increased to equal to the line voltage Vline (V1=0). Accordingly, V2 also becomes 0V and, in addition to the load current $I_L$, the excitation current is induced as the secondary side current $I_{M2FD}$. A difference between the load current $I_L$ and the secondary side current $I_{M2FD}$ is supplied from a body diode of the refluxing MOS transistor $Q_{M2R}$. At this time, V1≈V2≈0V, and the primary side input current $I_{in}$ and the secondary side current $I_{M2FD}$ are unchanged.

(Power Conversion Efficiency)

FIG. 24 illustrates a relationship between power conversion efficiency versus the load current IL flown through the output inductor L of the DC/DC converter 10 of FIG. 3 employing the control driving system and the DC/DC converter 10A of the comparative example in FIG. 1 employing the self-driving system.

The DC/DC converter 10 of FIG. 3 employing the control driving system performs the overcurrent prevention operation by the SS operation in the PWM scheme and the overvoltage prevention operation to alleviate dead time $\Delta t_D$ in which both of the synchronous rectification MOS transistor $Q_{M2F}$ and the refluxing MOS transistor $Q_{M2R}$ are in the turn-off state at the operation stop and provide the overlap period $\Delta t_{OL}$ in which both synchronous rectification MOS transistor $Q_{M2F}$ and the refluxing MOS transistor $Q_{M2R}$ are in the turn-on state.

As a result, the power conversion efficiency of the DC/DC converter 10 of FIG. 3 can be higher by about 0.5% to about 2% than that of the comparative example over a wide range of load current, as shown in FIG. 24.

(Electronic Apparatus)

The DC/DC converter 10 of FIG. 3 and other various embodiments of FIGS. 14, 18, 21 and 23 can be built in any electronic apparatus including, for example, a smart phone, a notebook computer, a tablet PC, a monitor, a TV, an external hard disk drive, a set-top box, a vacuum cleaner, a refrigerator, a washing machine, a telephone, a facsimile, a printer, a laser display, a communication device, a server and other devices.

The DC/DC converter 10 according to the various embodiments is capable of shortening rising time/falling time of the synchronous rectification MOS transistor $Q_{M2F}$ and the refluxing MOS transistor $Q_{M2R}$ and preventing an overcurrent and overvoltage, which may occur in the secondary side circuit, by the SS operation at the primary and secondary sides and the adjustment for providing the overlap period $\Delta t_{OL}$.

As described above, according to some embodiments, it is possible to provide a DC/DC converter that is capable of preventing an overvoltage and overcurrent which may occur in a stop operation, and also an operation method thereof and an electronic apparatus equipped with the DC/DC converter.

Other Embodiments

As described above, the present disclosure has been illustrated by way of some embodiments, but the description and drawings which constitute a part of this disclosure are exemplary and should not be construed to limit the present disclosure. Various alternative embodiments, examples and operation techniques will be apparent to those skilled in the art from this disclosure.

INDUSTRIAL APPLICABILITY

The DC/DC converter of the present disclosure can be applied to an insulating type DC/DC converters built in electric apparatus including appliances, mobile devices and other devices.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A DC/DC converter comprising:
a transformer interposed between an input and an output of the DC/DC converter;
a main MOS transistor connected in series between a primary side inductance of the transformer and a ground potential;
a synchronous rectification MOS transistor connected in series between a secondary side inductance of the transformer and the ground potential;
a refluxing MOS transistor connected between a secondary side output of the transformer and the ground potential and capable of refluxing an output current of the DC/DC converter; and
a controller connected to the main MOS transistor, the synchronous rectification MOS transistor and the refluxing MOS transistor, and configured to control input currents and output currents thereof,
wherein, when an operation of the DC/DC converter is stopped at a predetermined time, the controller stops a driving pulse of the main MOS transistor, controls duty cycles of pulse width of a driving pulse of the synchronous rectification MOS transistor and a pulse width of a driving pulse of the refluxing MOS transistor for a predetermined period of time from the stop of the driving pulse of the main MOS transistor in a pulse width modulation scheme by a soft stop operation, and, after a lapse of the predetermined period of time, stops the driving pulse of the synchronous rectification MOS transistor and the driving pulse of the refluxing MOS transistor.

2. The DC/DC converter of claim 1, wherein, when the operation of the DC/DC converter is stopped at the predetermined time, dead time is alleviated by providing an ON-ON overlap time at a timing of an ON/OFF switching of the driving pulse of the synchronous rectification MOS transistor and the driving pulse of the refluxing MOS transistor, both of which are output from the controller.

3. The DC/DC converter of claim 1, further comprising an auxiliary MOS transistor connected in series between the primary side inductance of the transformer and the ground potential and connected in parallel to the primary side main MOS transistor.

4. The DC/DC converter of claim 3, wherein the controller is connected to the auxiliary MOS transistor and, if the operation of the DC/DC converter is stopped at the predetermined time, stops a driving pulse of the auxiliary MOS transistor in synchronization with the driving pulses of the synchronous rectification MOS transistor and the refluxing MOS transistor after the lapse of the predetermined period of time by the soft stop operation.

5. The DC/DC converter of claim 1, wherein the controller is connected to a gate of the synchronous rectification MOS transistor via a first insulating transformer.

6. The DC/DC converter of claim 1, wherein the controller is connected to a gate of the refluxing MOS transistor via a second insulating transformer.

7. The DC/DC converter of claim 1, further comprising:
an output inductor connected between the secondary side output of the transformer and the output; and
an output capacitor connected between the output and the ground potential.

8. A DC/DC converter comprising:
a transformer interposed between an input and an output of the DC/DC converter;
a main MOS transistor connected in series between a primary side inductance of the transformer and a ground potential;
an auxiliary MOS transistor connected in series between the primary side inductance of the transformer and the ground potential via a capacitor and connected in parallel to the primary side main MOS transistor;
a synchronous rectification MOS transistor connected in series between a secondary side inductance of the transformer and the ground potential;
a refluxing MOS transistor connected between a secondary side output of the transformer and the ground potential and capable of refluxing an output current of the DC/DC converter; and
a controller configured to control the main MOS transistor, the auxiliary MOS transistor, the synchronous rectification MOS transistor and the refluxing MOS transistor,
wherein, when an operation of the DC/DC converter is stopped at a predetermined time, a driving pulse of the main MOS transistor output from the controller is stopped, and then, after a lapse of a predetermined period of time from the stop of the driving pulse of the main MOS transistor, duty cycles of pulse width of a driving pulse of the synchronous rectification MOS transistor, a driving pulse of the refluxing MOS transistor and a driving pulse of the auxiliary MOS transistor, which are output from the controller, are controlled in a pulse width modulation scheme by a soft stop operation.

9. A DC/DC converter comprising:
a transformer interposed between an input and an output of the DC/DC converter;
a main MOS transistor connected in series between a primary side inductance of the transformer and a ground potential;
an auxiliary MOS transistor connected in series between the primary side inductance of the transformer and the ground potential via a capacitor and connected in parallel to the primary side main MOS transistor;
a synchronous rectification MOS transistor connected in series between a secondary side inductance of the transformer and the ground potential;
a refluxing MOS transistor connected between a secondary side output of the transformer and the ground potential and capable of refluxing an output current of the DC/DC converter; and
a controller configured to control the main MOS transistor, the auxiliary MOS transistor, the synchronous rectification MOS transistor and the refluxing MOS transistor,
wherein, when an operation of the DC/DC converter is stopped at a predetermined time, the controller controls duty cycles of pulse width of a driving pulse of the synchronous rectification MOS transistor and a driving pulse of the refluxing MOS transistor in a pulse width modulation scheme by a soft stop operation to provide an ON-ON overlap time at a timing of an ON/OFF switching of a driving pulse of the synchronous rectification MOS transistor and a driving pulse of the refluxing MOS transistor, both of which are output from the controller, after the operation of the DC/DC converter is stopped, to alleviate dead time.

10. A method of operating a DC/DC converter including a transformer interposed between an input and an output of the DC/DC converter, a main MOS transistor connected in series between a primary side inductance of the transformer and a ground potential, an auxiliary MOS transistor connected in series between the primary side inductance of the transformer and the ground potential via a capacitor and connected in parallel to the primary side main MOS transistor, a synchronous rectification MOS transistor connected in series between a secondary side inductance of the transformer and the ground potential, a refluxing MOS transistor connected between a secondary side output of the transformer and the ground potential and capable of refluxing an output current of the DC/DC converter, and a controller connected to the main MOS transistor, the auxiliary MOS transistor, the synchronous rectification MOS transistor and the refluxing MOS transistor and configured to control input currents and output currents thereof, the method comprising:
turning off the main MOS transistor at a first timing;
controlling duty cycles of pulse width of a driving pulse of the auxiliary MOS transistor, a driving pulse of the synchronous rectification MOS transistor and a driving pulse of the refluxing MOS transistor in a pulse width modulation scheme by a soft stop operation for a predetermined period of time after the main MOS transistor is turned off to continue switching of the auxiliary MOS transistor, the synchronous rectification MOS transistor and the refluxing MOS transistor; and
turning off the auxiliary MOS transistor, the synchronous rectification MOS transistor and the refluxing MOS transistor after a lapse of the predetermined period of time,
wherein an overcurrent is prevented from being flown through the refluxing MOS transistor.

11. A method of operating a DC/DC converter including a transformer interposed between an input and an output of the DC/DC converter, a main MOS transistor connected in series between a primary side inductance of the transformer and a ground potential, an auxiliary MOS transistor connected in series between the primary side inductance of the transformer and the ground potential via a capacitor and connected in parallel to the primary side main MOS transistor, a synchronous rectification MOS transistor connected in series between a secondary side inductance of the transformer and the ground potential, a refluxing MOS transistor connected between a secondary side output of the transformer and the ground potential and capable of refluxing an output current of the DC/DC converter, and a controller connected to the main MOS transistor, the auxiliary MOS transistor, the synchronous rectification MOS transistor and the refluxing MOS transistor and configured to control input currents and output currents thereof, the method comprising:
turning off the main MOS transistor at a first timing;
controlling duty cycles of pulse width of a driving pulse of the auxiliary MOS transistor, a driving pulse of the synchronous rectification MOS transistor and a driving pulse of the refluxing MOS transistor for a predetermined period of time in a pulse width modulation scheme by a soft stop operation after the main MOS transistor is turned off to continue switching of the auxiliary MOS transistor, the synchronous rectification MOS transistor and the refluxing MOS transistor; and turning off the auxiliary MOS transistor, the synchronous rectification MOS transistor and the refluxing MOS transistor after a lapse of the predetermined period of time, wherein dead time is alleviated by providing an ON-ON overlap time at a timing of ON/OFF switching of the synchronous rectification MOS transistor and the refluxing MOS transistor to alleviate dead time.

12. An electronic apparatus equipped with a DC/DC converter of claim 1.

13. The electronic apparatus of claim 12, wherein the electronic apparatus is one of a monitor, an external hard disk drive, a set-top box, a notebook computer, a tablet PC, a smart phone, a battery charger system, a personal computer (PC), a display, a printer, a vacuum cleaner, a refrigerator, a facsimile, a telephone, a communication device and a server.

* * * * *